US012725971B2

(12) United States Patent
Takizawa

(10) Patent No.: US 12,725,971 B2
(45) Date of Patent: Sep. 1, 2026

(54) CONNECTOR ASSEMBLY AND STRUCTURE COMPRISING THE SAME

(71) Applicant: JAPAN AVIATION ELECTRONICS INDUSTRY, LIMITED, Tokyo (JP)

(72) Inventor: Satoru Takizawa, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 253 days.

(21) Appl. No.: 18/535,839

(22) Filed: Dec. 11, 2023

(65) Prior Publication Data

US 2024/0243521 A1 Jul. 18, 2024

(30) Foreign Application Priority Data

Jan. 18, 2023 (JP) ................................ 2023-005978

(51) Int. Cl.
*H01R 13/629* (2006.01)
*H01R 12/79* (2011.01)
*H01R 13/639* (2006.01)

(52) U.S. Cl.
CPC ........... *H01R 13/629* (2013.01); *H01R 12/79* (2013.01); *H01R 13/639* (2013.01)

(58) Field of Classification Search
CPC .... H01R 13/629; H01R 13/639; H01R 13/42; H01R 12/79; H01R 12/716; H01R 12/91; H01R 12/71
USPC ........................................ 439/247, 248, 355
See application file for complete search history.

(56) References Cited

U.S. PATENT DOCUMENTS 4,993,965 A * 2/1991 Eck .................... H01R 13/6315 439/248
5,007,858 A * 4/1991 Daly .................... H01R 12/772 439/291
5,184,961 A * 2/1993 Ramirez ............. H01R 13/518 439/328
5,931,688 A * 8/1999 Hasz ................. H01R 13/6315 439/247
6,030,242 A * 2/2000 Cunningham ..... H01R 13/6315 439/247

(Continued)

FOREIGN PATENT DOCUMENTS

JP 2018026366 A 2/2018
JP 2019075279 A 5/2019
JP 2022083578 A 6/2022

OTHER PUBLICATIONS

Extended European Search Report (EESR) dated Jun. 13, 2024, issued in counterpart European Application No. 23215094.6.

*Primary Examiner* — Tulsidas C Patel
*Assistant Examiner* — Thomas K Quigley
(74) *Attorney, Agent, or Firm* — Holtz, Holtz & Volek PC

(57) ABSTRACT

A connector assembly comprises a first connector and a second connector which are mateable with each other along a front-rear direction. The first connector comprises two or more sub-connectors and a housing. The sub-connectors are configured to be connected to two or more branching end portions of a single flexible printed circuits (FPC) board, respectively. The housing holds each of the sub-connectors. Each of the sub-connectors is floatable relative to the housing. The second connector comprises two or more mating portions which correspond to the sub-connectors, respectively. Each of the sub-connectors is mateable with a corresponding one of the mating portions.

12 Claims, 15 Drawing Sheets

(56) References Cited

U.S. PATENT DOCUMENTS

| | | | | |
|---|---|---|---|---|
| 6,162,099 | A * | 12/2000 | Wu | H01R 31/06 439/67 |
| 6,336,830 | B1 * | 1/2002 | Lee | H01R 24/62 439/76.1 |
| 6,817,892 | B2 | 11/2004 | Sakai et al. | |
| 7,878,829 | B2 * | 2/2011 | Yang | H01R 13/6315 439/247 |
| 8,602,828 | B2 * | 12/2013 | Li | H01R 13/642 439/247 |
| 8,821,174 | B2 * | 9/2014 | Kimura | H01R 13/6315 439/570 |
| 9,039,433 | B2 * | 5/2015 | Barthelmes | H01R 24/542 439/248 |
| 11,398,691 | B2 * | 7/2022 | Komoto | H01R 13/2407 |
| 11,398,694 | B2 | 7/2022 | Henry et al. | |
| 11,735,851 | B2 * | 8/2023 | Nakajima | H01R 12/778 439/499 |
| 2006/0240696 | A1 * | 10/2006 | Ide | H01R 13/506 439/248 |
| 2008/0176442 | A1 * | 7/2008 | Kuo | H01R 12/592 439/494 |
| 2011/0235263 | A1 * | 9/2011 | Tan | H05K 1/147 361/679.33 |
| 2013/0189868 | A1 * | 7/2013 | Fitt | F02C 7/32 439/272 |
| 2013/0273752 | A1 * | 10/2013 | Rudisill | H01R 13/6205 439/39 |
| 2014/0273638 | A1 * | 9/2014 | Valenti | H01R 13/6466 439/620.22 |
| 2015/0270660 | A1 * | 9/2015 | Chen | H01R 12/774 439/676 |
| 2016/0028174 | A1 * | 1/2016 | Jung | H01R 12/77 439/660 |
| 2016/0111822 | A1 * | 4/2016 | Patel | H01R 13/6466 439/620.21 |
| 2016/0118735 | A1 * | 4/2016 | Hoyack | H01R 43/16 439/247 |
| 2016/0164233 | A1 * | 6/2016 | Zhu | H01R 24/50 439/248 |
| 2019/0115702 | A1 | 4/2019 | Kawaguchi et al. | |
| 2025/0300378 | A1 * | 9/2025 | Ramonat | H01R 13/2407 |

* cited by examiner

CONNECTOR ASSEMBLY AND STRUCTURE COMPRISING THE SAME

CROSS REFERENCE TO RELATED APPLICATIONS

This application is based on and claims priority under 35 U.S.C. § 119 to Japanese Patent Application No. JP 2023-005978 filed Jan. 18, 2023, the content of which is incorporated herein in its entirety by reference.

BACKGROUND OF THE INVENTION

This invention relates to a connector assembly comprising a first connector and a second connector which are mateable with each other.

For example, this type of connector assembly is disclosed in JP2002-083578A (Patent Document 1), the content of which is incorporated herein by reference.

Referring to FIG. 29, Patent Document 1 discloses a connector assembly comprising a first connector 90 and a mating connector (not shown), or a second connector, which are mateable with each other along a mating direction shown in FIG. 29. The second connector is provided in a case 98. The first connector 90 comprises three connectors (sub-connectors) 92 and an outer housing (housing) 94. Each of the sub-connectors 92 is provided with two cables 96 attached thereto. Each of the sub-connectors 92 is held in the housing 94 and is movable relative to the housing 94 to some extent in a perpendicular plane perpendicular to the mating direction. In other words, each of the sub-connectors 92 is held by the housing 94 as if it is floatable in the perpendicular plane. The case 98 is formed with three attachment holes 99 which correspond to the sub-connectors 92, respectively.

When the first connector 90 is mated with the second connector, each of the sub-connectors 92 is mated with the second connector through the corresponding attachment hole 99. Each of the sub-connectors 92 is movable in the corresponding attachment hole 99 in the perpendicular plane when passing through the corresponding attachment hole 99. According to Patent Document 1, the first connector 90 has a floating structure which allows a movement of each of the sub-connectors 92, and thereby all the three sub-connectors 92 can be simultaneously mated with the second connector while the floating structure adjusts misalignment of the sub-connectors 92 with the attachment holes 99 which might be caused because of manufacturing tolerances.

However, according to an existing connector assembly such as that of Patent Document 1, when the sub-connectors are attached to the housing, the sub-connectors might be attached to incorrect positions of the housing.

SUMMARY OF THE INVENTION

It is therefore an object of the present invention to provide a connector assembly which comprises a connector including two or more floatably held sub-connectors and which enables the sub-connectors to be attached to correct positions of the housing.

An aspect of the present invention provides a connector assembly comprising a first connector and a second connector which are mateable with each other along a front-rear direction. The first connector comprises two or more sub-connectors and a housing. The sub-connectors are configured to be connected to two or more branching end portions of a single flexible printed circuits (FPC) board, respectively. The housing holds each of the sub-connectors. Each of the sub-connectors is floatable relative to the housing. The second connector comprises two or more mating portions which correspond to the sub-connectors, respectively. Each of the sub-connectors is mateable with a corresponding one of the mating portions.

An aspect of the present invention further provides a structure comprising the connector assembly and a single FPC board which has two or more branching end portions. The sub-connectors are connected to the end portions, respectively.

The first connector of an aspect of the present invention is a connector which comprises two or more of the floatably held sub-connectors. The sub-connectors of an aspect of the present invention are configured to be connected to two or more of the branching end portions of the single FPC board, respectively. According to this structure, when the sub-connectors connected to the FPC board are attached to the housing, the order of the sub-connectors has been already determined. Accordingly, when the sub-connectors are attached to the housing, each of the sub-connectors can be attached to a correct position with no mistake. Thus, an aspect of the present invention provides the connector assembly which comprises the connector including two or more of the floatably held sub-connectors and which enables the sub-connectors to be attached to correct positions of the housing.

An appreciation of the objectives of the present invention and a more complete understanding of its structure may be had by studying the following description of the preferred embodiment and by referring to the accompanying drawings.

Figure 1:
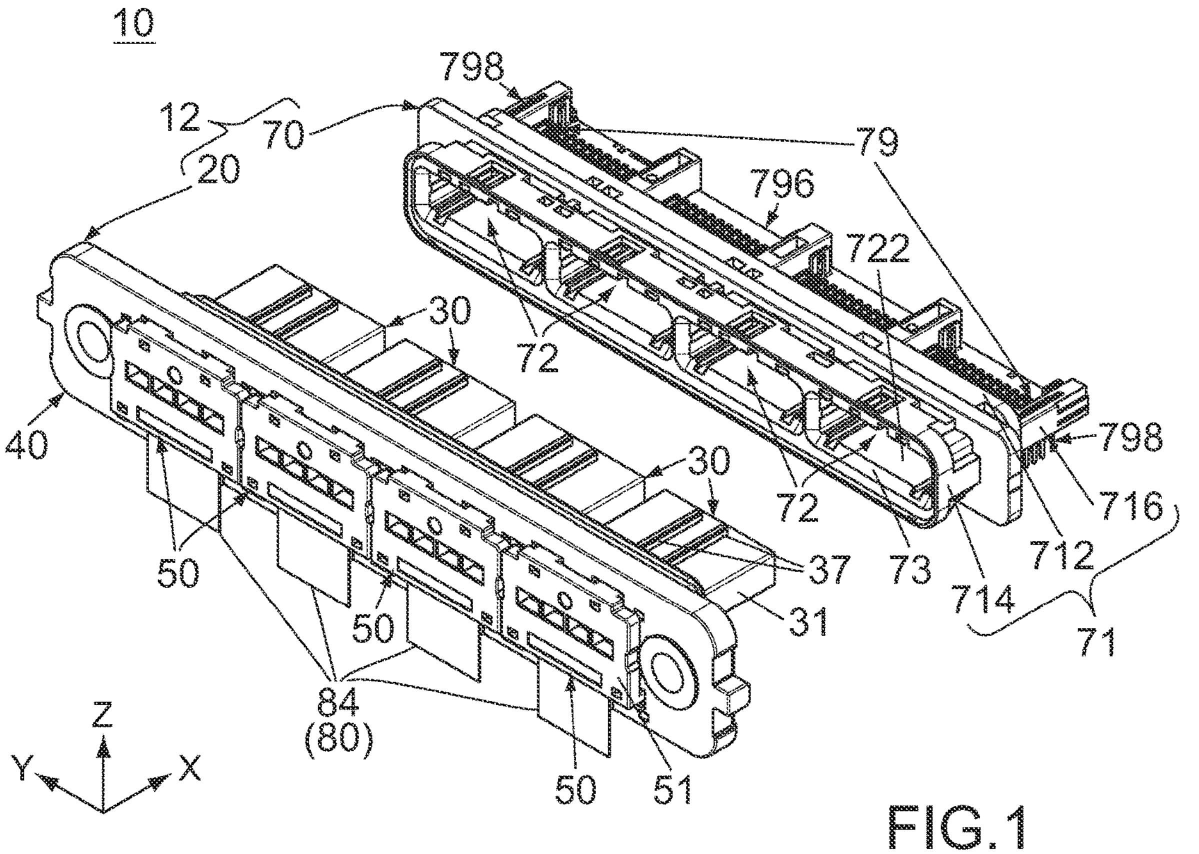
FIG. 1 is a perspective view showing a structure formed of a connector assembly and an FPC board according to an embodiment of the present invention, wherein a first connector and a second connector of the connector assembly are under a separated state where they are separated from each other, and the first connector is attached to end portions of the FPC board.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
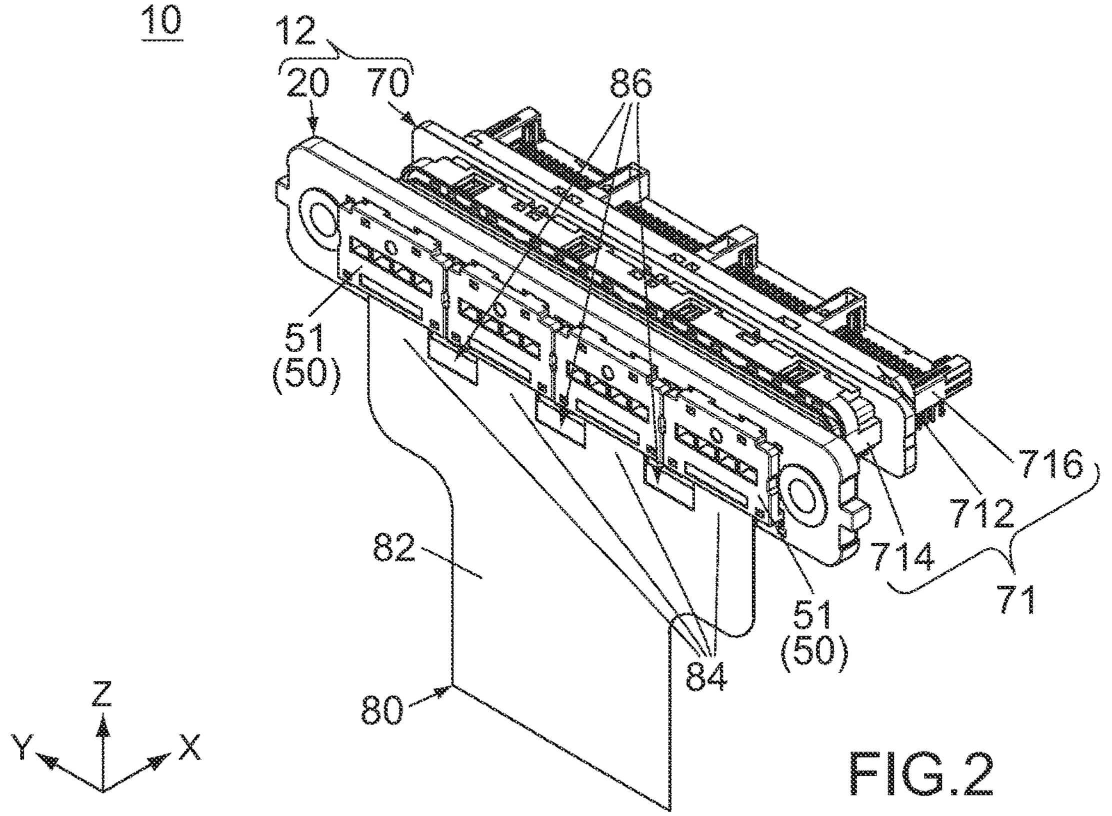
FIG. 2 is another perspective view showing the structure of FIG. 1, wherein the first connector and the second connector are under a mated state where they are mated with each other.

Referring to FIGS. 1 and 2, a structure 10 according to an embodiment of the present invention comprises a connector assembly 12 and a flexible printed circuits (FPC) board 80. The connector assembly 12 comprises a first connector 20 and a second connector 70. The first connector 20 and the second connector 70 are mateable with each other along a mating direction. The mating direction of the present embodiment is a front-rear direction which is the X-direction. In the present embodiment, "forward" means the positive X-direction, and "rearward" means the negative X-direction. Thus, the connector assembly 12 of the present embodiment comprises the first connector 20 and the second connector 70 which are mateable with each other along the front-rear direction. In the explanation described below, a word such as the front-rear direction does not indicate an absolute direction or an absolute position relative to the ground but only indicates a relative direction or a relative position in the figures.

The structure 10 according to the present embodiment is incorporated in an automobile (not shown) when used. In detail, the first connector 20 is configured to be fixed to a first device (not shown) incorporated in the automobile and is configured to be connected to the bendable FPC board 80. The second connector 70 is configured to be fixed to a second device (not shown) incorporated in the automobile. The first connector 20 and the second connector 70 can be mated with each other by a robot (not shown). However, the present invention is not limited thereto but is applicable to various structures 10.

Under a mated state where the first connector 20 and the second connector 70 are mated with each other as shown in FIG. 2, the first device (not shown) to which the first connector 20 is fixed and the second device (not shown) to which the second connector 70 is fixed are electrically connected with each other via the FPC board 80 and the connector assembly 12. Under a separated state where the first connector 20 and the second connector 70 are separated from each other as shown in FIG. 1, the first device and the second device are electrically disconnected from each other.

Hereafter, explanation will be made about the FPC board 80 of the present embodiment.

The FPC board 80 has a single base portion 82 and two or more end portions 84. The illustrated base portion 82 extends along an upper-lower direction perpendicular to the front-rear direction. The upper-lower direction of the present embodiment is the Z-direction. In the present embodiment, "upward" means the positive Z-direction, and "downward" means the negative Z-direction. Each of the end portions 84 is connected to an upper end of the base portion 82. The end portions 84 are arranged in a left-right direction perpendicular to both the front-rear direction and the upper-lower direction. The left-right direction of the present embodiment is the Y-direction. In the present embodiment, "leftward" means the positive Y-direction, and "rightward" means the negative Y-direction.

Every two of the end portions 84 adjacent to each other in the left-right direction are provided with a gap 86. Each of the gaps 86 is located between two of the end portions 84. Thus, every two of the end portions 84 adjacent to each other in the left-right direction are apart from each other with the gap 86 located therebetween. Each of the end portions 84 extends upward from the upper end of the base portion 82. The FPC board 80 of the present embodiment has two or more of the end portions 84 which branch from the base portion 82 as described above. The number of the end portions 84 of the present embodiment is four. However, the present invention is not limited thereto. For example, the number of the end portions 84 may be two, three, five or more.

The FPC board 80 is formed with a large number of conductive lines (not shown). For example, the number of the conductive lines is eighty. Each of the conductive lines extends along a surface of the base portion 82 and then extends along a surface of one of the end portions 84. Each of the end portions 84 of the present embodiment is formed with a large number of the conductive lines. The end portions 84 of the present embodiment have structures same as each other. The arrangements of the conductive lines on the four end portions 84 are same as each other.

Hereafter, explanation will be made about the first connector 20 of the present embodiment.

Figure 9:
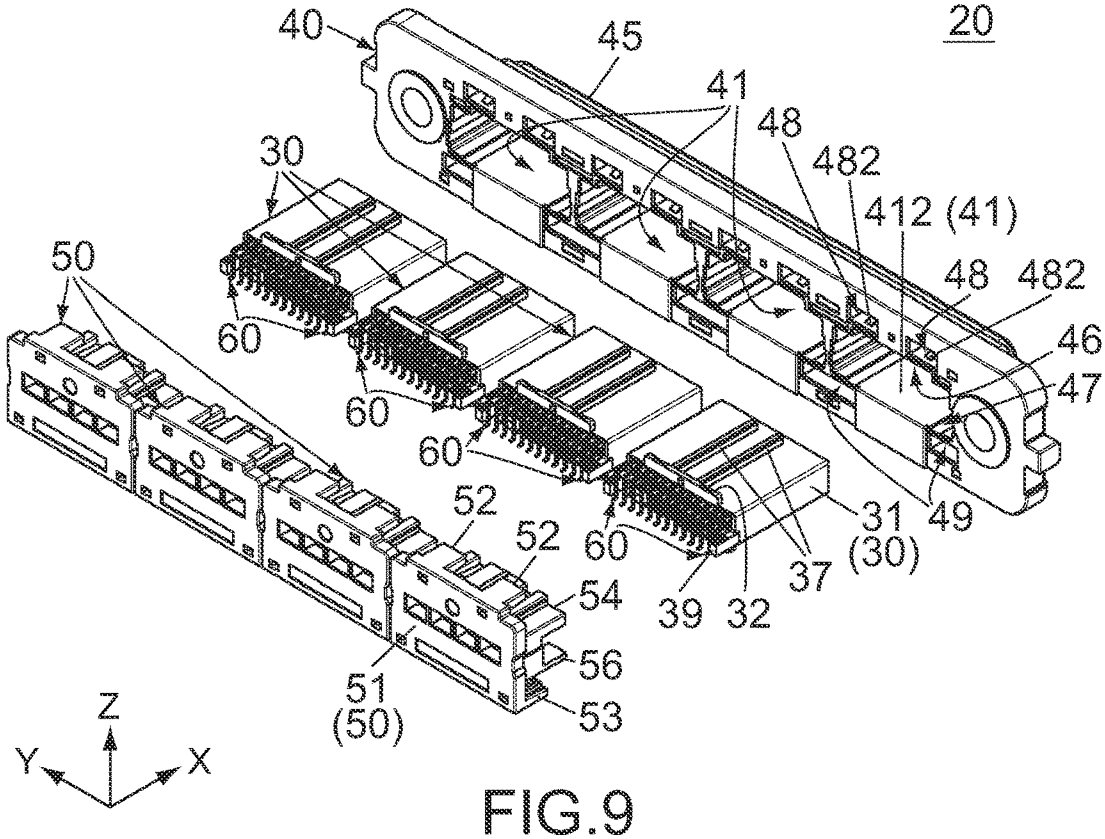
FIG. 9 is an exploded, perspective view showing the first connector of the connector assembly of FIG. 1.

Referring to FIG. 9, the first connector 20 of the present embodiment comprises two or more sub-connectors 30, a housing 40 made of insulator, two or more retainers 50 each made of insulator and a large number of first terminals 60 each made of conductor. For example, the number of the first terminals 60 is eighty. Each of the first terminals 60 is held by one of the sub-connectors 30. Each of the sub-connectors 30 holds two or more of the first terminals 60. The first connector 20 of the present embodiment comprises the aforementioned members. However, the present invention is not limited thereto. For example, the retainers 50 may be provided as necessary. The first connector 20 may further comprise another member in addition to the aforementioned members.

Referring to FIG. 1, the sub-connectors 30 are connected to the end portions 84 of the FPC board 80, respectively, and are partially accommodated in the housing 40. The retainers 50 are provided so that they correspond to the sub-connectors 30, respectively. Each of the retainers 50 keeps the corresponding sub-connector 30 in the housing 40. Each of the number of the sub-connectors 30 and the number of the retainers 50 of the present embodiment is four. However, the present invention is not limited thereto. For example, the number of the sub-connectors 30 may be two, three, five or more. Only one of the retainers 50 may be provided for two or more of the sub-connectors 30. Thus, the number of the retainers 50 may be one or more.

Figure 27:
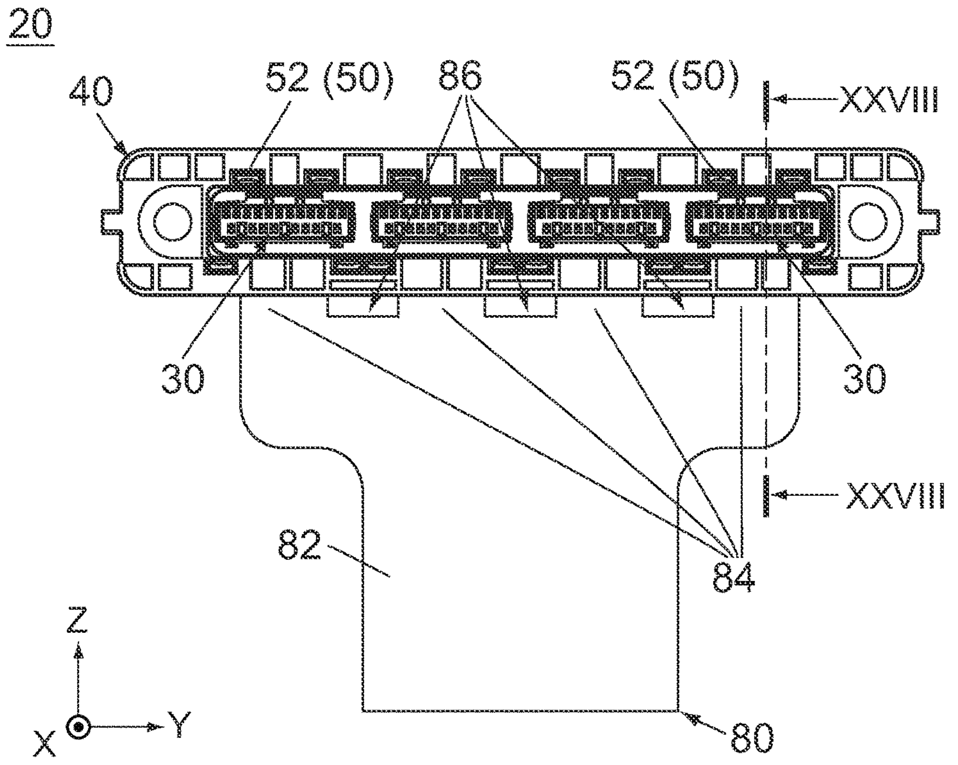
FIG. 27 is another front view showing the first connector of FIG. 21, wherein the first connector is connected to the FPC board.
Figure 28:
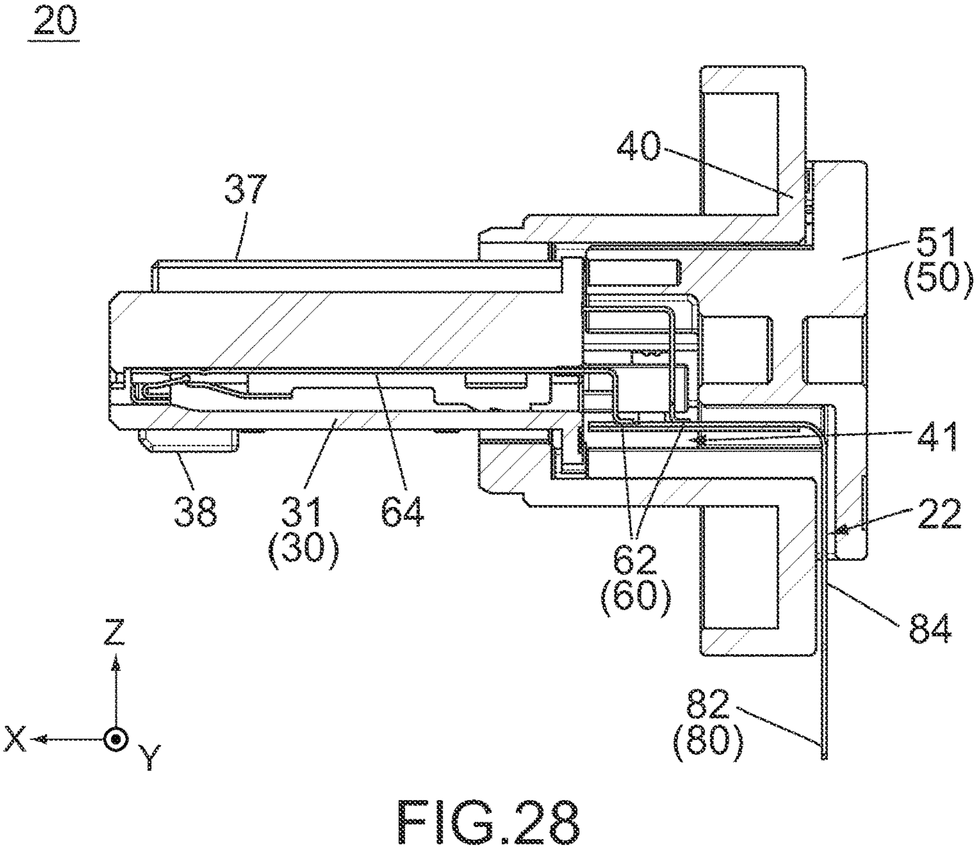
FIG. 28 is a cross-sectional view showing the first connector of FIG. 27, taken along line XXVIII-XXVIII.
Figure 29:
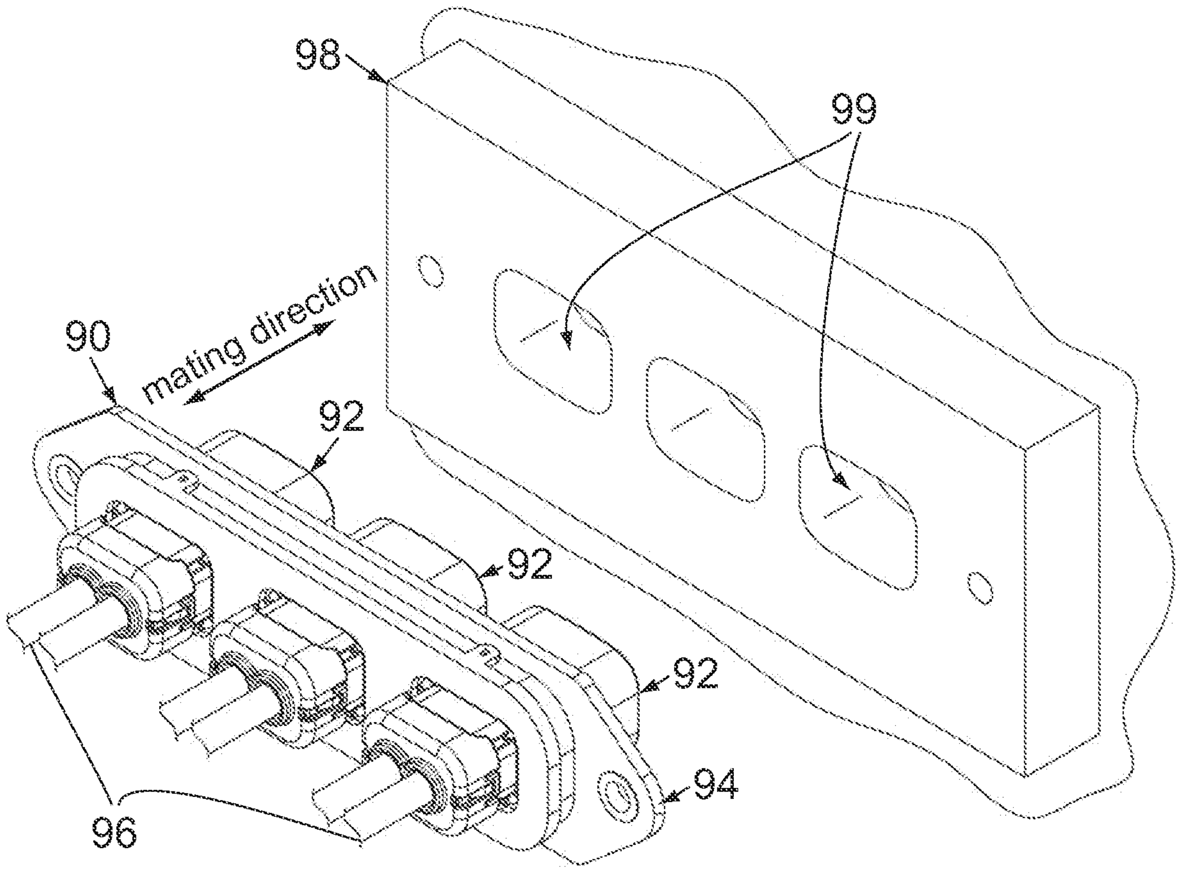
FIG.29 PRIOR ART
FIG. 29 is a perspective view showing a connector assembly of Patent Document 1.

Referring to FIG. 9, the sub-connectors 30 of the present embodiment have structures same as each other. In addition, the arrangements of the first terminals 60 of the four sub-connectors 30 are identical to each other. Thus, all the sub-connectors 30 are components same as each other, and thereby manufacturing cost of the sub-connectors 30 can be reduced. Referring to FIGS. 27 and 28, the sub-connectors 30 are configured to be connected to two or more of the branching end portions 84 of the single FPC board 80, respectively. According to the present embodiment, the sub-connectors 30 having structures same as each other are connected to the end portions 84 having structures same as each other, respectively. According to the present embodiment, each of the sub-connectors 30 is connectable to any one of the end portions 84. However, the present invention is not limited thereto. For example, the sub-connectors 30 may have structures different from each other.

Hereafter, explanation will be made about one of the sub-connectors 30 of the present embodiment. The following explanation is applicable to each of the sub-connectors 30.

Figure 10:
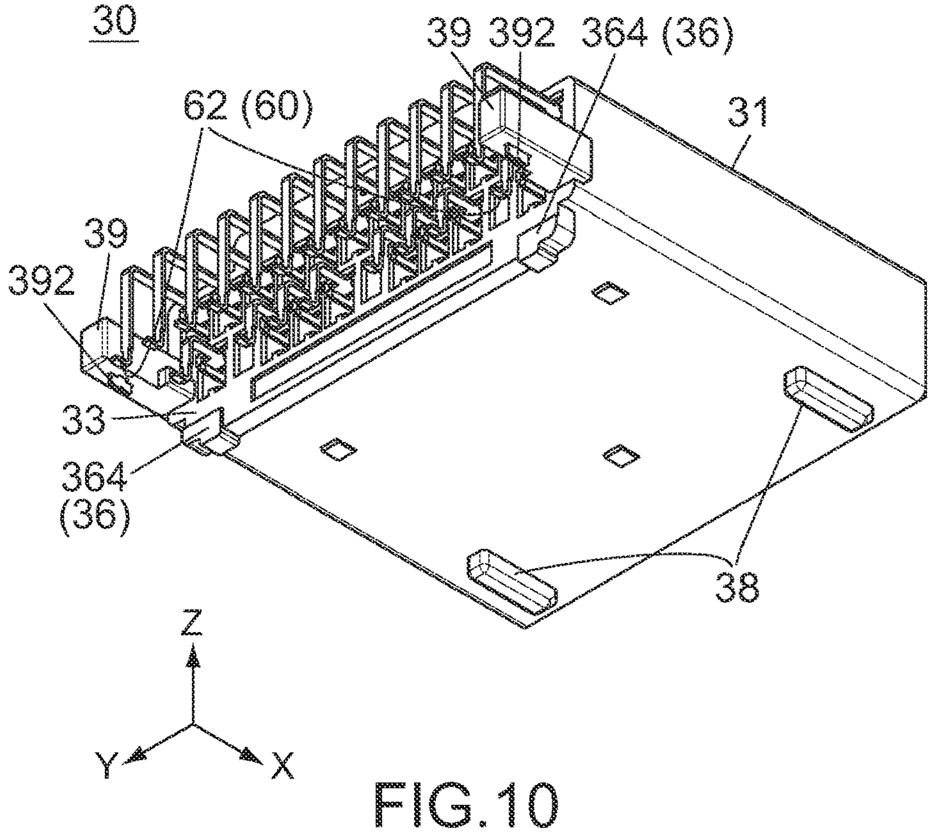
FIG. 10 is a perspective view showing one of the sub-connectors of the first connector of FIG. 9.

Referring to FIGS. 9 and 10, the sub-connector 30 of the present embodiment has a main portion 31, an upper projecting plate 32, a lower projecting plate 33, two upper keys 37, two lower keys 38, two rear projections 39 and two fixing members 392 each made of metal. The main portion 31, the upper projecting plate 32, the lower projecting plate 33, the upper keys 37, the lower keys 38 and the rear projections 39 are integrally molded of resin. The fixing members 392 are press-fit in the rear projections 39, respectively. The fixing members 392 fix the sub-connector 30 on the end portion 84 (see FIG. 3) of the FPC board 80 (see FIG. 3) when the first connector 20 is used.

The sub-connector 30 of the present embodiment has the aforementioned members and portions. However, the structure of the sub-connector 30 of the present invention is not specifically limited. For example, the rear projections 39 and the fixing members 392 may be provided as necessary. Moreover, the structure of each portion of the sub-connector 30 described below can be modified as necessary.

Figure 12:
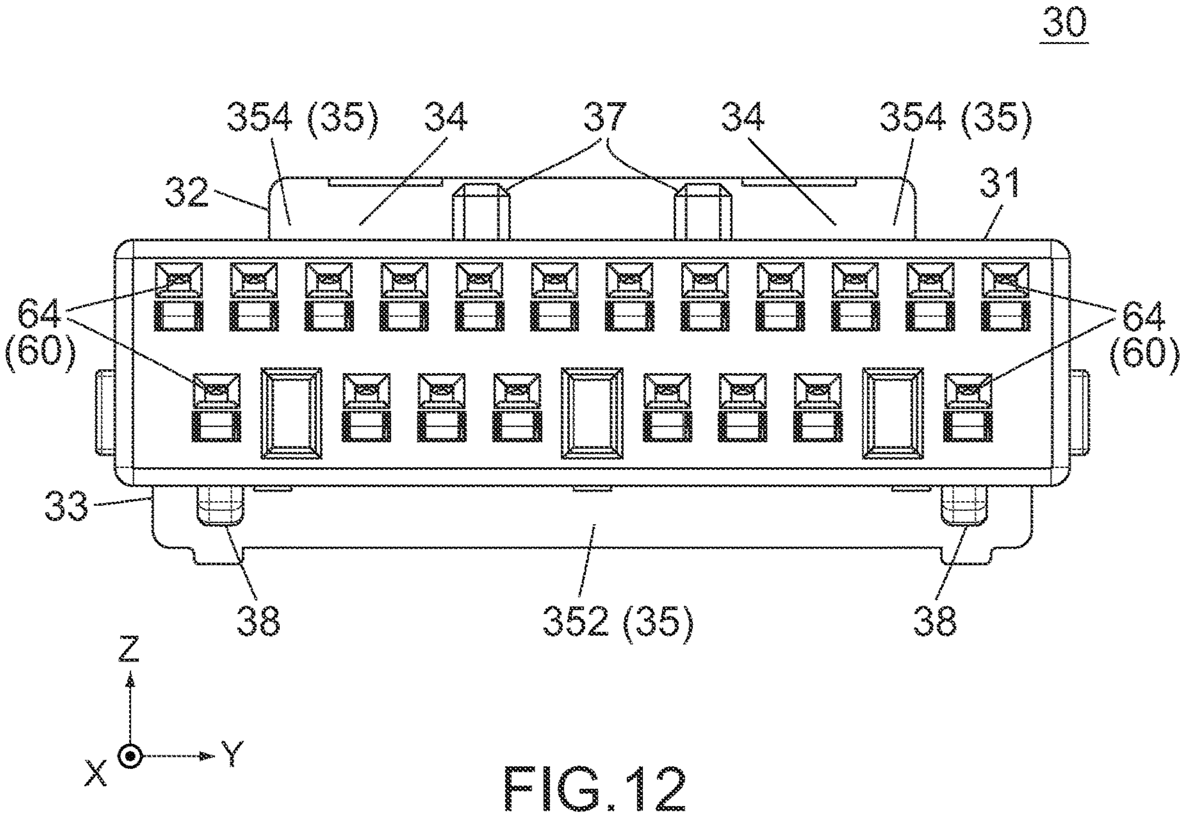
FIG. 12 is a front view showing the sub-connector of FIG. 10.
Figure 13:
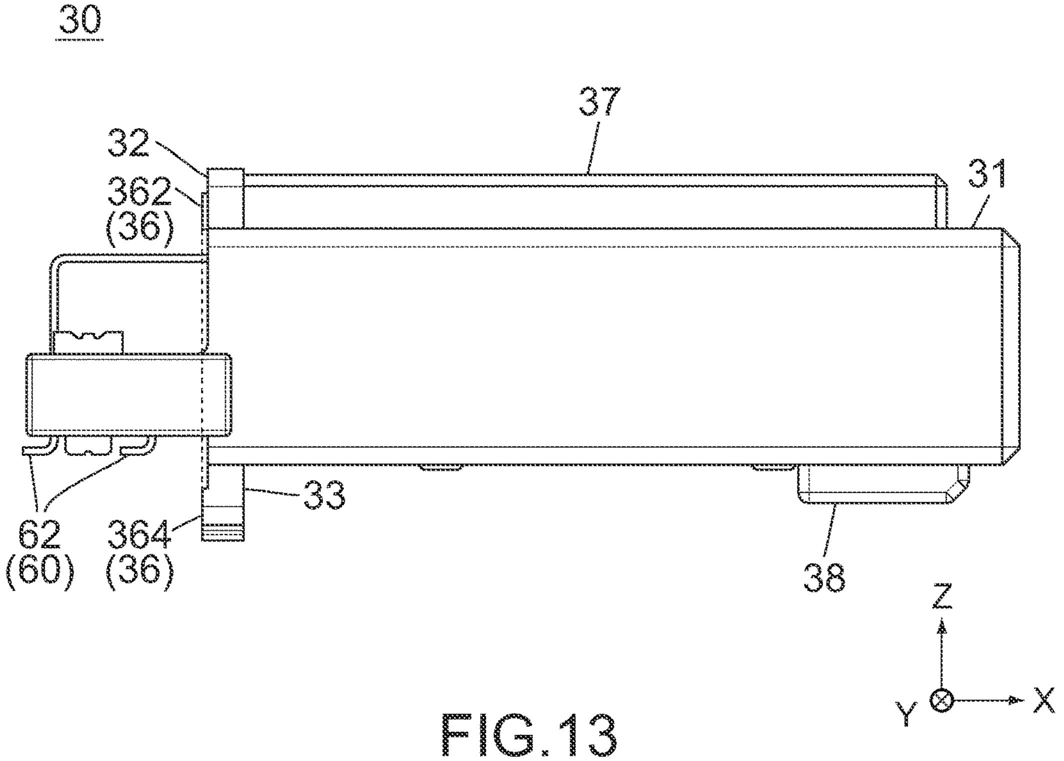
FIG. 13 is a side view showing the sub-connector of FIG. 10, wherein a position of a plane which includes rear definers is illustrated with dashed line.

Referring to FIG. 9, the main portion 31 has a rectangular flat-plate shape in parallel to a horizontal plane (XY-plane) perpendicular to the upper-lower direction. The upper projecting plate 32 has a rectangular flat-plate shape in parallel to a vertical plane (YZ-plane) perpendicular to the front-rear direction. The upper projecting plate 32 is located at a rear end of the main portion 31. The upper projecting plate 32 projects upward from the main portion 31 and extends along the left-right direction. Referring to FIGS. 9, 12 and 13, each of the upper keys 37 has a rectangular bar shape which extends along the front-rear direction. The upper keys 37 are provided on an upper surface of the main portion 31. The upper keys 37 are apart from each other in the left-right direction and extend in parallel to each other from the upper projecting plate 32 to the vicinity of a front end of the main portion 31.

Referring to FIG. 10, the lower projecting plate 33 has a rectangular flat-plate shape in parallel to the YZ-plane. The lower projecting plate 33 is located at the rear end of the main portion 31. The lower projecting plate 33 project downward from the main portion 31 and extends along the left-right direction. Referring to FIGS. 10, 12 and 13, each of the lower keys 38 has a rectangular bar shape which extends along the front-rear direction. The lower keys 38 are provided in the vicinity of a front end of a lower surface of the main portion 31. The lower keys 38 are apart from each other in the left-right direction and extend in parallel to each other in the vicinity of the front end of the lower surface of the main portion 31.

Referring to FIG. 9, the sub-connector 30 is inserted into the housing 40 from behind. Referring to FIG. 12 together with FIG. 9, the two upper keys 37 are located between the two lower keys 38 in the left-right direction. As described later, the upper keys 37 and the lower keys 38 which are arranged as described above prevent upside-down insertion of the sub-connector 30 into the housing 40.

Referring to FIG. 12, the sub-connector 30 of the present embodiment has three front definers 35 and two regulated portions 34. The front definers 35 are parts for regulating a forward movement of the sub-connector 30 in the housing 40 (see FIG. 9) as described later. The front definers 35 of the present embodiment consist of one front definer 352 and two front definers 354. The regulated portions 34 are parts for temporarily keeping the sub-connector 30 in the housing 40 as described later.

The lower projecting plate 33 of the present embodiment has a flat front surface, and this front surface has a middle part in the left-right direction which works as the front definer 352. The upper projecting plate 32 of the present embodiment has a flat front surface, and this front surface has opposite parts thereof in the left-right direction which work as the front definers 354, respectively. Each of the front definers 35 of the present embodiment is a flat surface in parallel to the YZ-plane. Each of the front definers 35 is not provided with a visible boundary. The three front definers 35 are located at vertexes of an imaginary downward-facing isosceles triangle, respectively. The three front definers 35 are located at positions same as each other in the front-rear direction. However, the present invention is not limited thereto. For example, each of the front definers 35 may be a part which protrudes forward from the upper projecting plate 32 or the lower projecting plate 33. Moreover, the front definers 35 may be provided as necessary.

According to the present embodiment, the flat front surface of the upper projecting plate 32 has opposite parts thereof in the left-right direction which work as the regulated portions 34, respectively. The two regulated portions 34 are located between the two front definers 354 in the left-right direction. Each of the regulated portions 34 of the present embodiment is a flat surface in parallel to the YZ-plane. Each of the regulated portions 34 is not provided with a visible boundary. However, the present invention is not limited thereto. For example, the regulated portions 34 may be provided as necessary.

Figure 11:
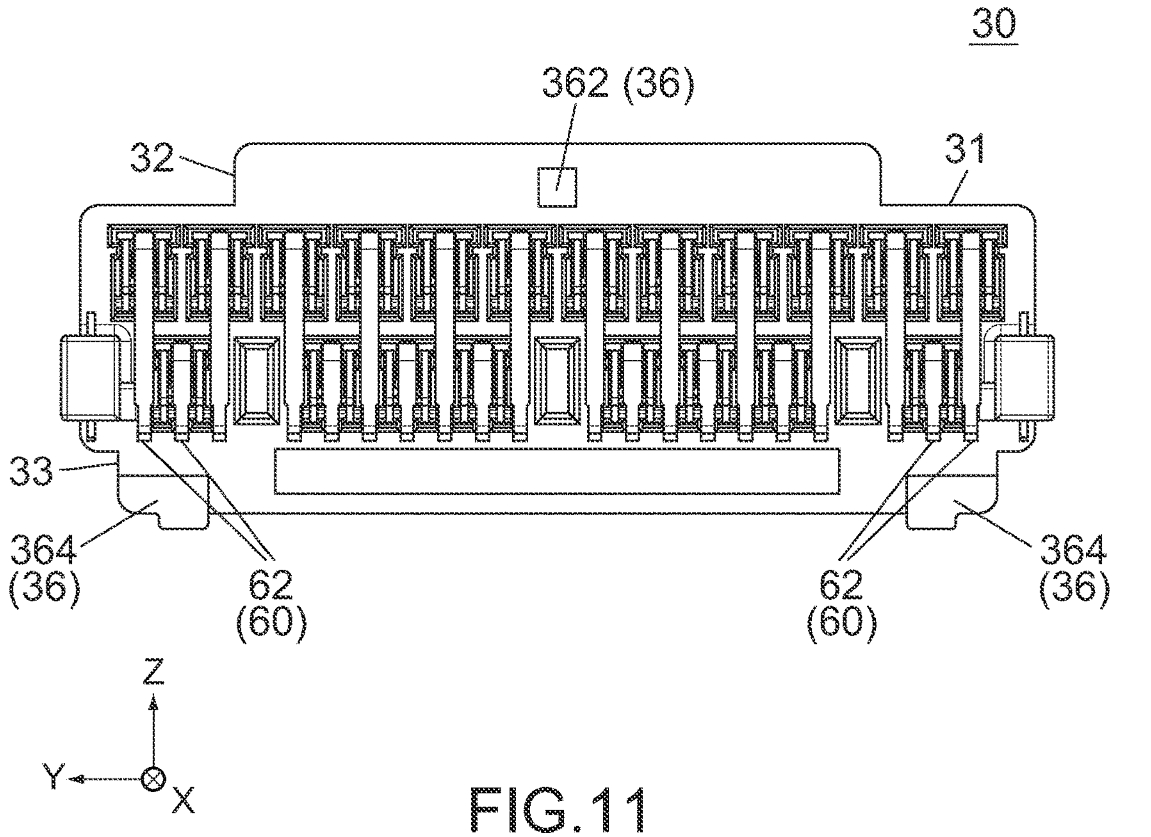
FIG. 11 is a rear view showing the sub-connector of FIG. 10.

Referring to FIG. 11, the sub-connector 30 of the present embodiment has three rear definers 36. The rear definers 36 are parts for regulating a rearward movement of the sub-connector 30 in the housing 40 as described later. The rear definers 36 of the present embodiment consist of one rear definer 362 and two rear definers 364.

The rear definer 362 is located at the middle of a flat rear surface of the upper projecting plate 32 in the left-right direction. The rear definer 362 protrudes rearward from the rear surface of the upper projecting plate 32. The rear definers 364 are located at opposite sides of a flat rear surface of the lower projecting plate 33 in the left-right direction, respectively. Each of the rear definers 364 protrudes rearward from the rear surface of the lower projecting plate 33. The three rear definers 36 are located at vertexes of an imaginary upward-facing isosceles triangle, respectively. The three rear definers 36 have rear end surfaces which are located at positions same as each other in the front-rear direction. However, the present invention is not limited thereto. For example, each of the rear definers 36 may be a part of the flat rear surface of the upper projecting plate 32 or the flat rear surface of the lower projecting plate 33. Moreover, the rear definers 36 may be provided as necessary.

Referring to FIG. 13, each of the first terminals 60 is press-fit into the main portion 31 from behind. Referring to FIGS. 12 and 13, each of the first terminals 60 has a surface mount portion 62 and a first connection portion 64. Each of the first connection portions 64 is held by the main portion 31 and extends along the front-rear direction in the main portion 31. Each of the surface mount portions 62 is located rearward of the main portion 31. Each of the surface mount portions 62 is a flat surface in parallel to the XY-plane. All the surface mount portions 62 are located in a common plane in parallel to the XY-plane. The first terminals 60 of the present embodiment have the aforementioned structures and are arranged as described above. However, the structures and the arrangement of the first terminals 60 are not specifically limited, provided that all the surface mount portions 62 are located in a common horizontal plane.

Referring to FIG. 9, the housing 40 of the present embodiment is molded of resin and extends along the YZ-plane as a whole. In particular, the housing 40 extends longer along the left-right direction than along the upper-lower direction. The housing 40 is formed with two or more accommodation portions 41 which correspond to the sub-connectors 30, respectively. Each of the accommodation portions 41 is a space which is enclosed by an accommodation wall 412 in the YZ-plane. The accommodation portions 41 are arranged in the left-right direction. Moreover, the housing 40 has a front surface 45. The front surface 45 is located at a front end of the housing 40 and extends over all the accommodation portions 41 in the left-right direction. The thus-formed front surface 45 is located at a front end of each of the accommodation walls 412.

Figure 14:
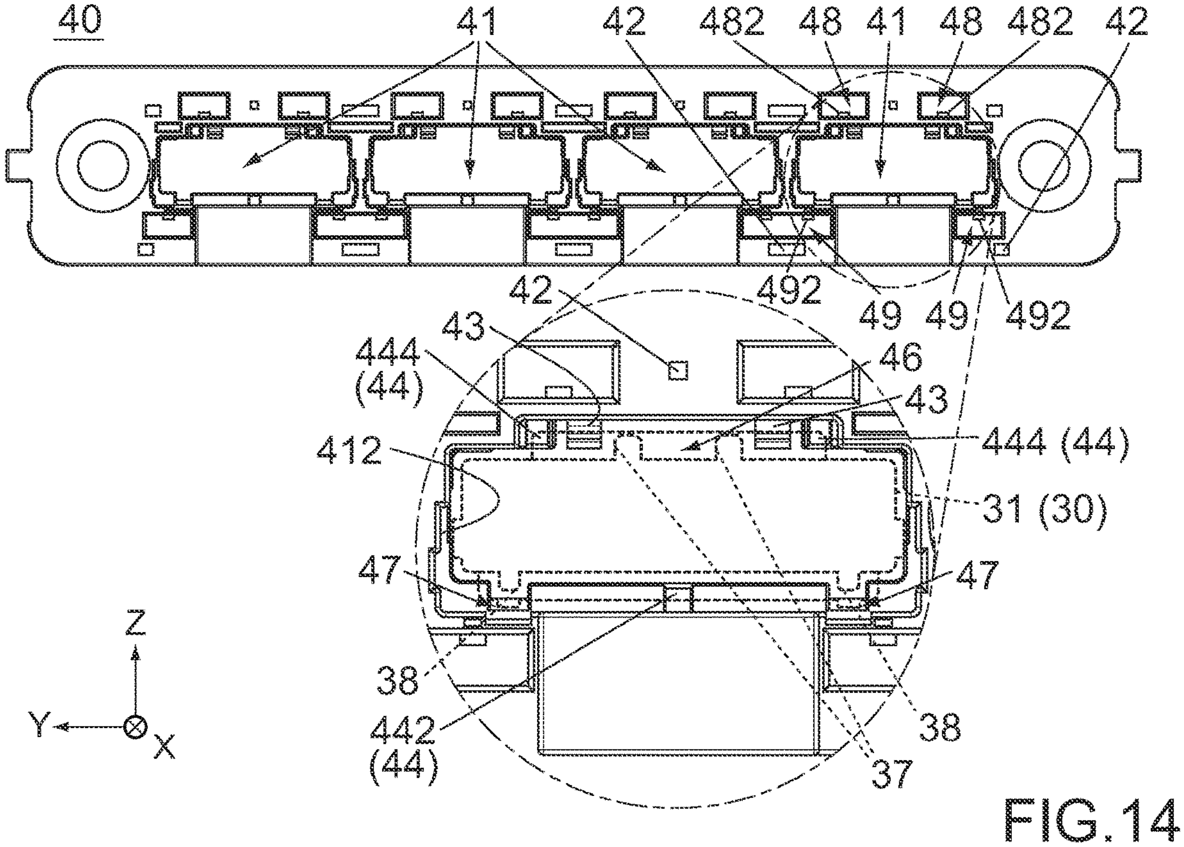
FIG. 14 is a rear view showing a housing of the first connector of FIG. 9, wherein a part of the housing enclosed by chain dotted lines is enlarged and illustrated, and in the enlarged view, an outline of the sub-connector accommodated in the housing is illustrated with dashed line.
Figure 15:
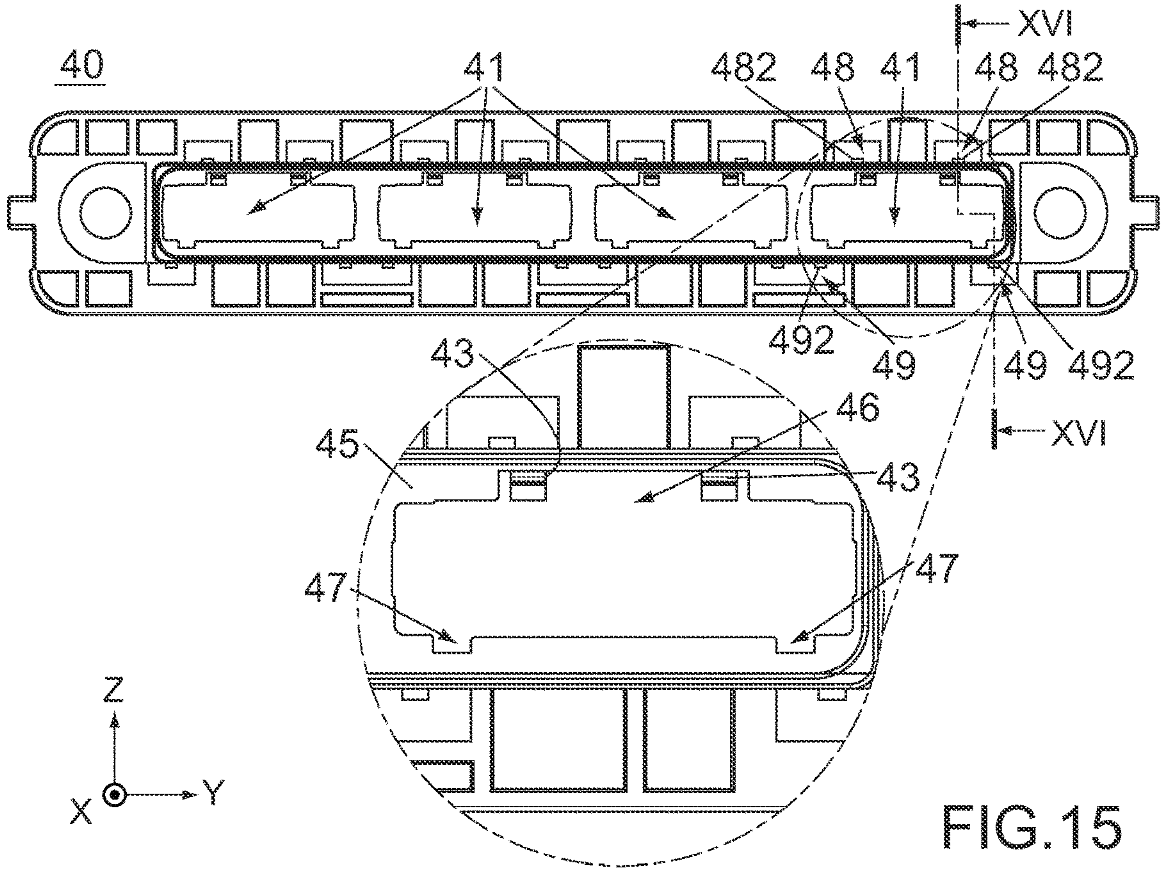
FIG. 15 is a front view showing the housing of FIG. 14, wherein a part of the housing enclosed by chain dotted lines is enlarged and illustrated.

Referring to FIGS. 14 and 15, each of the accommodation portions 41 passes through the housing 40 in the front rear direction. In other word, each of the accommodation portions 41 opens rearward from the housing 40 and opens forward from the housing 40. The housing 40 of the present embodiment is formed with four of the accommodation portions 41. However, the present invention is not limited thereto. For example, the number of the accommodation portions 41 may be two, three, five or more.

Figure 19:
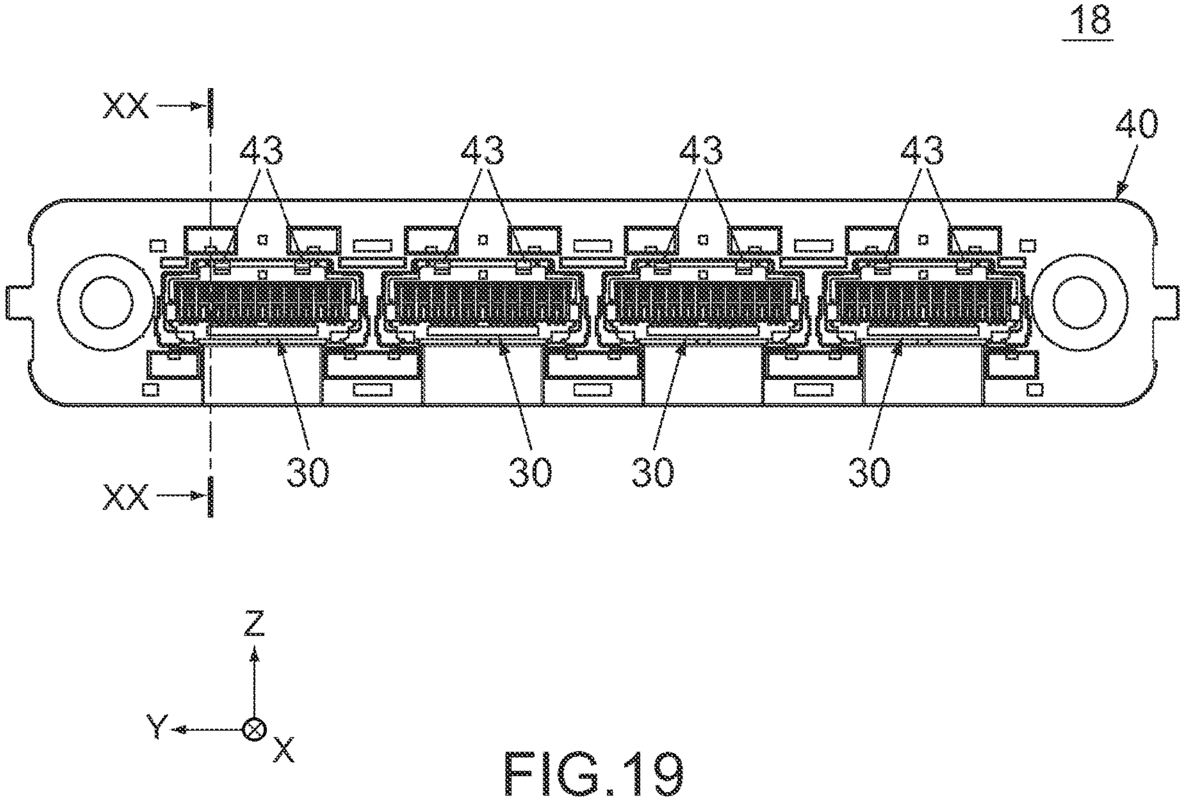
FIG. 19 is a rear view showing an intermediate structure formed of the housing and the sub-connectors of FIG. 9.
Figure 20:
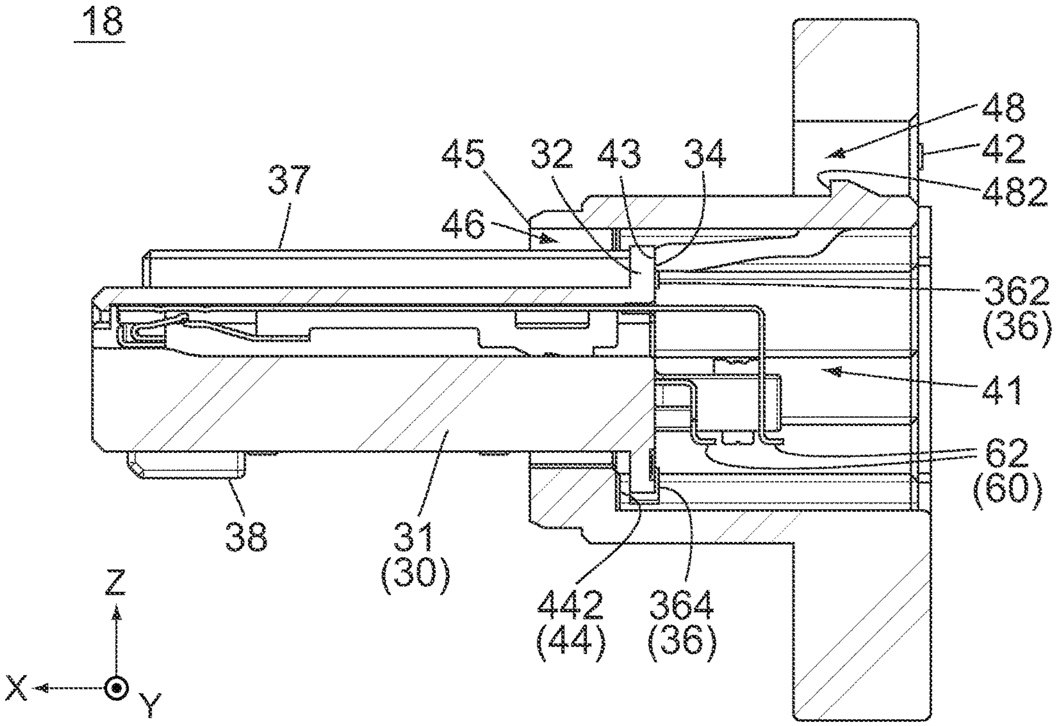
FIG. 20 is a cross-sectional view showing the intermediate structure of FIG. 19, taken along line XX-XX.

Referring to FIG. 20 together with FIG. 9, when the first connector 20 is assembled, first, each of the sub-connectors 30 is inserted into the corresponding accommodation portion 41 from behind and is accommodated in the corresponding accommodation portion 41. When the four sub-connectors 30 are accommodated in the four accommodation portions 41, respectively, an intermediate structure 18 shown in FIGS. 19 and 20 is formed.

Referring to FIG. 14, when the sub-connectors 30 are accommodated in the accommodation portions 41, respectively, each of the main portions 31 is apart from an inner wall surface of the accommodation portion 41 in the YZ-plane. Each of the main portions 31 is movable by a predetermined distance in each of the upper-lower direction and the left-right direction until it is brought into abutment with the inner wall surface of the accommodation portion 41. In other words, the housing 40 holds each of the sub-connectors 30, and each of the sub-connectors 30 is floatable relative to the housing 40.

The housing 40 of the present embodiment is formed with upper fixation holes 48 and lower fixation holes 49 in addition to the accommodation portions 41. In detail, two of the upper fixation holes 48 and two of the lower fixation holes 49 are formed around each of the accommodation portions 41. Every two of the lower fixation holes 49 which are adjacent to each other in the left-right direction communicate with each other in the left-right direction.

The accommodation portions 41 of the present embodiment, including portions which are provided for the respective accommodation portions 41, have basic structures same as each other. For example, the upper fixation holes 48 have structures same as each other. The lower fixation holes 49 have structures same as each other although the two lower fixation holes 49 which are adjacent to each other in the left-right direction communicate with each other. However, the present invention is not limited thereto. For example, in an instance where the sub-connectors 30 have structures different from each other, the accommodation portions 41 may have structures which correspond to the sub-connectors 30, respectively, and are different from each other. Hereafter, explanation will be made about one of the accommodation portions 41 of the present embodiment and about the portions which are provided for this accommodation portion 41. The following explanation is applicable to each of the accommodation portions 41.

Referring to FIGS. 14 and 15, the accommodation portion 41 of the present embodiment is formed with an upper passage 46 and two lower passages 47. Thus, the housing 40 of the present embodiment has the upper passage 46 and the lower passages 47. The upper passage 46 is a space which is located at an upper end of the accommodation portion 41.

The upper passage 46 is a part of the accommodation portion 41 which partially protrudes upward. The upper passage 46 is located at the middle of the accommodation portion 41 in the left-right direction. Each of the lower passages 47 is a space which is located at a lower end of the accommodation portion 41. Each of the lower passages 47 is a recess which is recessed downward. The two lower passages 47 are located at opposite sides of the accommodation portion 41 in the left-right direction, respectively. The upper passage 46 is located between the two lower passages 47 in the left-right direction.

Referring to FIG. 15 together with FIG. 14, each of the upper passage 46 and the lower passages 47 passes through the housing 40 in the front-rear direction. In other words, each of the upper passage 46 and the lower passages 47 opens rearward from the housing 40 and opens forward from the housing 40. Referring to FIG. 15 together with FIG. 16, the upper passage 46 opens at the front surface 45. Similarly, each of the lower passages 47 opens at the front surface 45.

Referring to FIG. 14, the upper passage 46 extends long in the left-right direction so as to cover positions which correspond to the two upper keys 37 of the sub-connector 30 in the YZ-plane. The thus-formed upper passage 46 allows the upper keys 37 to pass therethrough in a process in which the sub-connector 30 is accommodated in the accommodation portion 41. The two lower passages 47 are formed at positions which correspond to the two lower keys 38 of the sub-connector 30 in the YZ-plane, respectively. The thus-formed lower passages 47 allow the lower keys 38 to be pass therethrough, respectively, in the process in which the sub-connector 30 is accommodated in the accommodation portion 41.

Referring to FIG. 14 together with FIG. 20, according to the present embodiment, when the sub-connector 30 is accommodated in the accommodation portion 41, the lower keys 38 are located only forward of the front surface 45 of the housing 40. The thus-arranged lower keys 38 do not interfere with a movement of the sub-connector 30 in The YZ-plane. Moreover, when the sub-connector 30 is accommodated in the accommodation portion 41, the upper keys 37 are partially located in the upper passage 46 and is movable in the upper passage 46 in the YZ-plane.

Referring to FIG. 14, the upper keys 37 and the lower keys 38 are located at positions different from each other in the left-right direction. Upon an attempt of accommodating the sub-connector 30 in the accommodation portion 41 upside-down, at least one of the upper keys 37 and the lower keys 38 is brought into abutment with a front inner wall surface of the accommodation portion 41. As a result, the upside-down accommodation, or reverse accommodation, of the sub-connector 30 in the accommodation portion 41 is prevented.

Referring to FIG. 14 together with FIG. 20, the upper keys 37 and the lower keys 38 of the present embodiment are arranged as described above and work as described above. However, the present invention is not limited thereto. For example, the upper keys 37 may be provided in the vicinity of the front end of the main portion 31, and the lower keys 38 may be provided so that they extend over the whole main portion 31 in the front-rear direction. Thus, when the sub-connector 30 is accommodated in the accommodation portion 41, one of the upper key 37 and the lower key 38 may be located only forward of the front surface 45 of the housing 40, and a remaining one of the upper key 37 and the lower key 38 may be movable in the upper passage 46 or the lower passage 47. Moreover, the upper passage 46 and the lower passages 47 may be provided as necessary. In an instance where the upper passage 46 and the lower passages 47 are not provided, the upper keys 37 and the lower keys 38 do not need to be provided.

Figure 16:
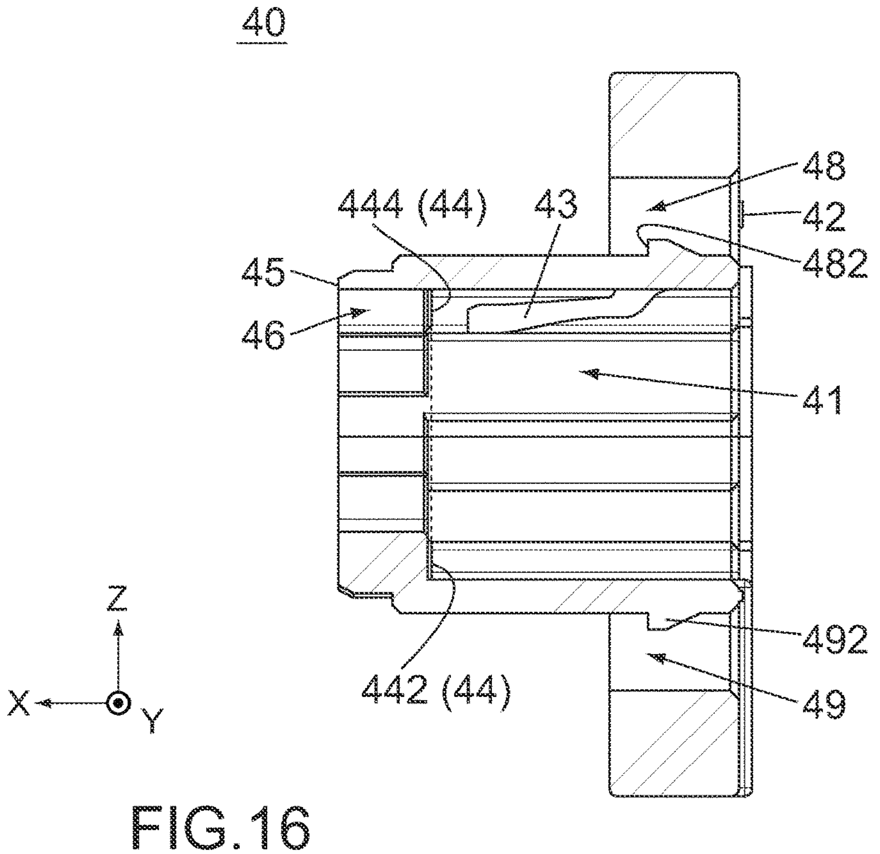
FIG. 16 is a cross-sectional view showing the housing of FIG. 15, taken along line XVI-XVI, wherein a position of a plane which includes front facing portions is illustrated with dashed line.

Referring to FIGS. 14 to 16, the accommodation portion 41 of the housing 40 of the present embodiment is provided with two regulation portions 43. The regulation portions 43 are located at opposite sides of the upper passage 46 in the left-right direction, respectively. Each of the regulation portions 43 extends along the front-rear direction in the accommodation portion 41 and is resiliently deformable. Referring to FIG. 20, in a process in which the sub-connector 30 is inserted into the accommodation portion 41, the upper projecting plate 32 of the sub-connector 30 is moved forward while each of the regulation portions 43 is moved upward. When the sub-connector 30 is accommodated in the accommodation portion 41, the regulated portions 34 of the upper projecting plate 32 are located forward of the regulation portions 43, respectively. Thus, when the sub-connector 30 is accommodated in the accommodation portion 41, the regulation portions 43 and the regulated portions 34 face each other in the front-rear direction and prevent the sub-connector 30 from coming off the accommodation portion 41.

According to the present embodiment, the sub-connector 30 can be temporarily kept in the housing 40 before the retainers 50 (see FIG. 9) are attached. Accordingly, the first connector 20 (see FIG. 9) can be easily assembled. According to the present embodiment, each of the regulation portions 43 is resiliently deformable, and each of the regulated portions 34 is unmovable relative to the sub-connector 30. However, the present invention is not limited thereto. For example, each of the regulation portions 43 may be provided so that it is unmovable relative to the housing 40, and each of the regulated portions 34 may be resiliently deformable. Thus, one of the regulation portion 43 and the regulated portion 34 may be resiliently deformable. Moreover, the regulation portions 43 and the regulated portions 34 may be provided as necessary.

Referring to FIGS. 14 and 16, the accommodation portion 41 of the present embodiment is provided with three front facing portions 44. Thus, the housing 40 of the present embodiment has the three front facing portions 44. The front facing portions 44 of the present embodiment consist of one front facing portion 442 and two front facing portions 444.

The front facing portion 442 and the front facing portions 444 are provided on a front inner wall surface of the accommodation portion 41. The front facing portion 442 is located at a position same as those of the lower passages 47 of the accommodation portion 41 in the upper-lower direction and is located at the middle of the accommodation portion 41 in the left-right direction. The front facing portion 442 protrudes rearward from the front inner wall surface of the accommodation portion 41. The front facing portions 444 are located at positions same as that of the upper passage 46 of the accommodation portion 41 in the upper-lower direction and are located at opposite sides of the upper passage 46 in the left-right direction, respectively. The two regulation portions 43 are located between the wo front facing portions 444 in the left-right direction. Each of the front facing portions 444 protrudes rearward from the front inner wall surface of the accommodation portion 41. The three front facing portions 44 are located at vertexes of an imaginary downward-facing isosceles triangle, respectively. The three front facing portions 44 have rear end surfaces which are located at positions same as each other in the front-rear direction.

Figure 22:
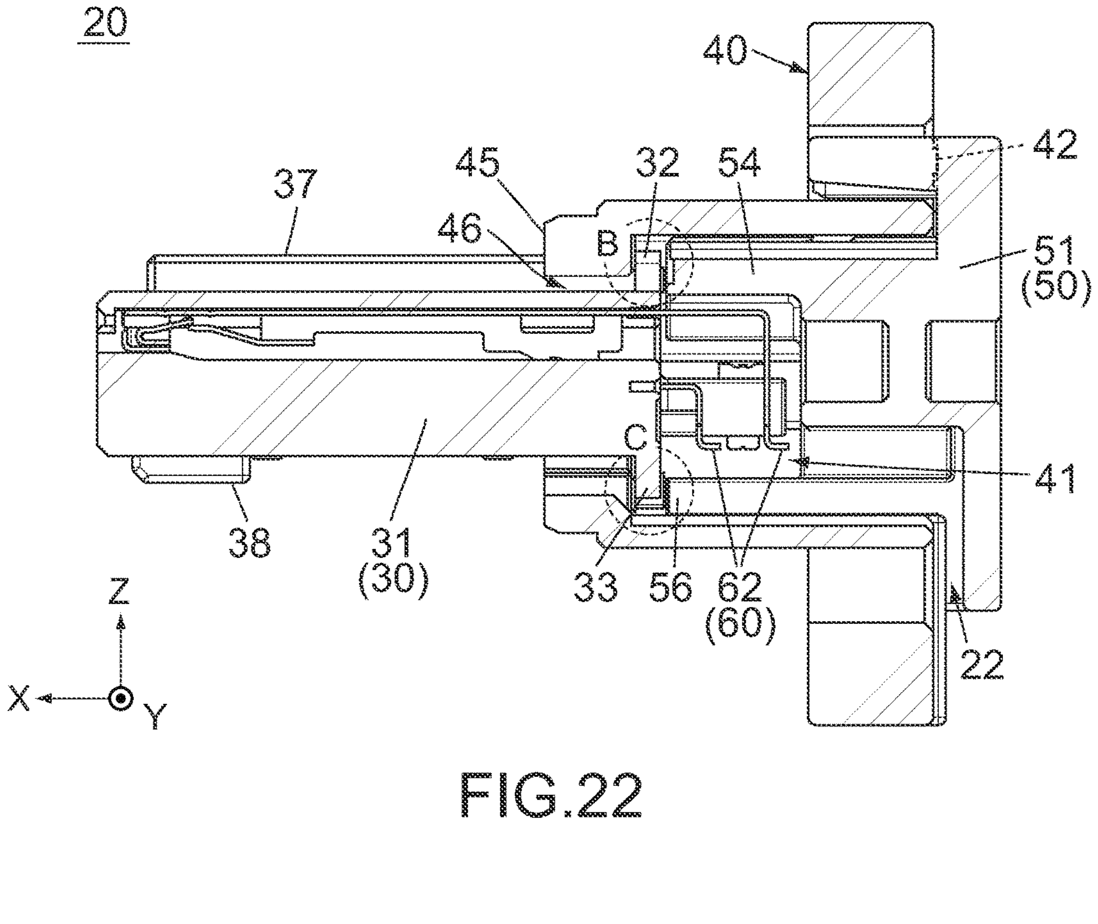
FIG. 22 is a cross-sectional view showing the first connector of FIG. 21, taken along line XXII-XXII, wherein an outline of a hidden stopper of the housing and a part of a hidden front surface of the retainer are illustrated with dashed line.
Figure 23:
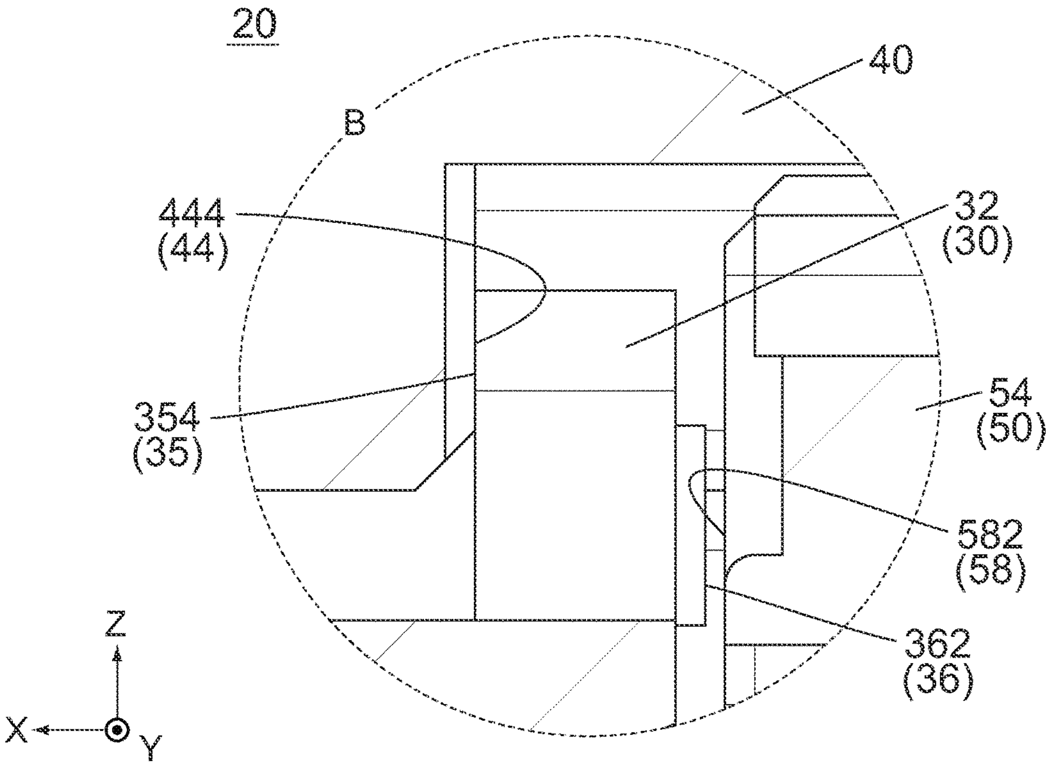
FIG. 23 is an enlarged, cross-sectional view showing a part of the first connector enclosed by dashed line B of FIG. 22.
Figure 24:
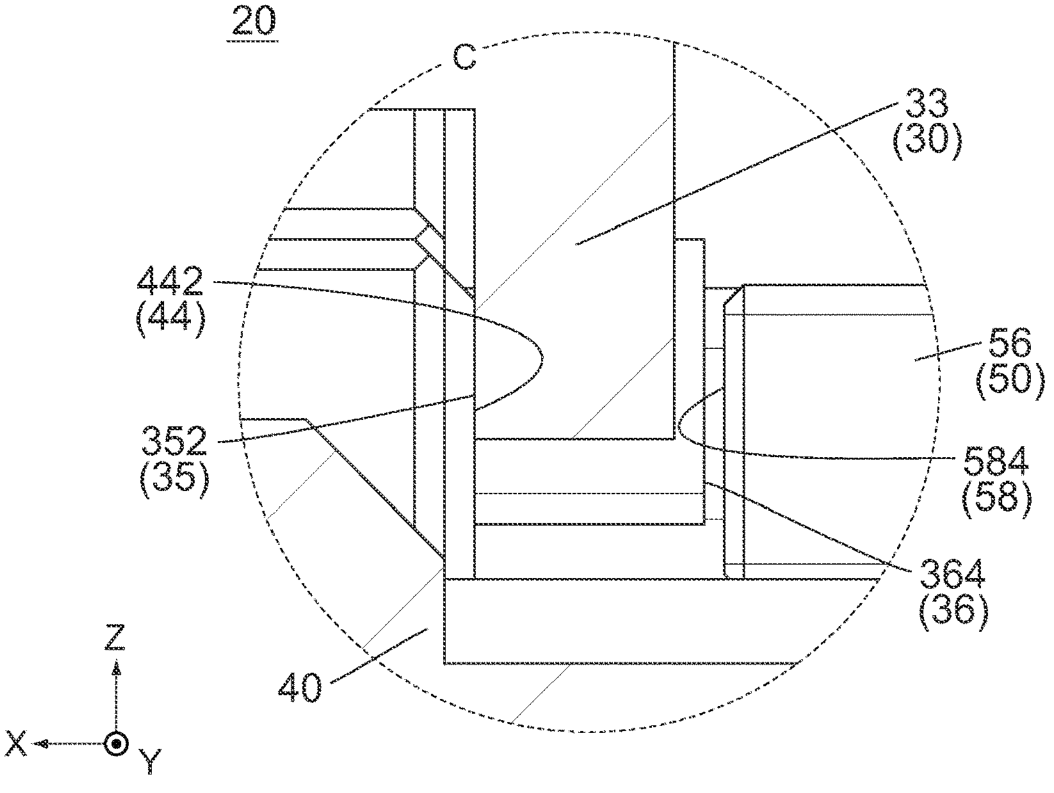
FIG. 24 is an enlarged, cross-sectional view showing a part of the first connector enclosed by dashed line C of FIG. 22.

Referring to FIGS. 23 and 24 together with FIG. 22, when the sub-connector 30 is accommodated in the accommodation portion 41, the front facing portion 442 faces the front definer 352 of the sub-connector 30 in the front-rear direction, and the front facing portions 444 face the front definers 354 of the sub-connector 30 in the front-rear direction, respectively. As can be seen from this arrangement, the sub-connector 30 is movable forward to a front limit position. However, the sub-connector 30 cannot be moved forward beyond the front limit position. This front limit position is a position at which the front definers 35 are brought into abutment with the front facing portions 44, respectively. Thus, the front limit position is a position at which a front end of the sub-connector 30 protrudes from the housing 40 to the maximum.

According to the present embodiment, the three front definers 35 are brought into abutment with the three front facing portions 44, respectively, in a common plane in parallel to the YZ-plane. Moreover, abutment areas between the front definers 35 and the front facing portions 44 can be made small because small projections work as the front facing portions 44. If flat surfaces and flat surfaces were brought into abutment with each other, abutment areas tend to be large. As the abutment areas are larger, it is more difficult to form the front definers 35 at proper positions because of problems such as warp which might be generated in a molding process. In contrast, according to the present embodiment, the front facing portions 44 which are the small projections can be easily formed at proper positions when the housing 40 is molded. Even if a part which includes the front definers 35 warps in a molding process of the main portion 31 of the sub-connector 30, the three front definers 35 can be brought into abutment with the three front facing portions 44, respectively.

According to the present embodiment, each of the front facing portions 44 is an abutment portion which protrudes in the front-rear direction, and each of the front definers 35 is a flat surface which faces this abutment portion. However, the present invention is not limited thereto. For example, each of the front definers 35 may be an abutment portion which protrudes in the front-rear direction, and each of the front facing portions 44 may be a flat surface which faces this abutment portion. Thus, one of the front definer 35 and the front facing portion 44 may be an abutment portion which protrudes in the front-rear direction, and a remaining one of the front definer 35 and the front facing portion 44 may be a flat surface which faces the abutment portion. Moreover, the front definers 35 and the front facing portions 44 may be provided as necessary.

Referring to FIGS. 14 and 15, the two upper fixation holes 48 of the present embodiment are located above the accommodation portion 41 and are located at opposite sides of the accommodation portion 41 in the left-right direction, respectively. The lower fixation holes 49 of the present embodiment are located below the accommodation portion 41 and are located at opposite sides of the accommodation portion 41 in the left-right direction, respectively. Each of the upper fixation holes 48 and the lower fixation holes 49 passes through the housing 40 in the front-rear direction. Each of the upper fixation holes 48 is provided with an upper engagement projection 482 located therein. Each of the upper engagement projections 482 projects upward. Each of the lower fixation holes 49 is provided with a lower engagement projection 492 located therein. Each of the lower engagement projections 492 projects downward.

The housing 40 of the present embodiment has the aforementioned structure. However, the structure of the housing 40 of the present invention is not specifically limited but can be modified as necessary.

Referring to FIG. 22 together with FIG. 20, the first connector 20 of the present embodiment can be formed by attaching the retainers 50 to the intermediate structure 18. According to the present embodiment, each of the retainers 50 is attached to the housing 40 from behind and covers the corresponding sub-connector 30 from behind. The thus-attached retainers 50 are fixed to the housing 40 and thereby securely prevent the sub-connectors 30 from coming off the accommodation portion 41. However, the present invention is not limited thereto, but the retainers 50 may be provided as necessary. For example, only some of all the sub-connectors 30 may be covered by the retainers 50. Only one of the retainers 50 may cover the sub-connectors 30 from behind.

Referring to FIG. 9, the retainers 50 of the present embodiment have structures same as each other. However, the present invention is not limited thereto. For example, the retainers 50 may have structures different from each other. Hereafter, explanation will be made about one of the retainers 50 of the present embodiment. The following explanation is applicable to each of the retainers 50.

Figure 17:
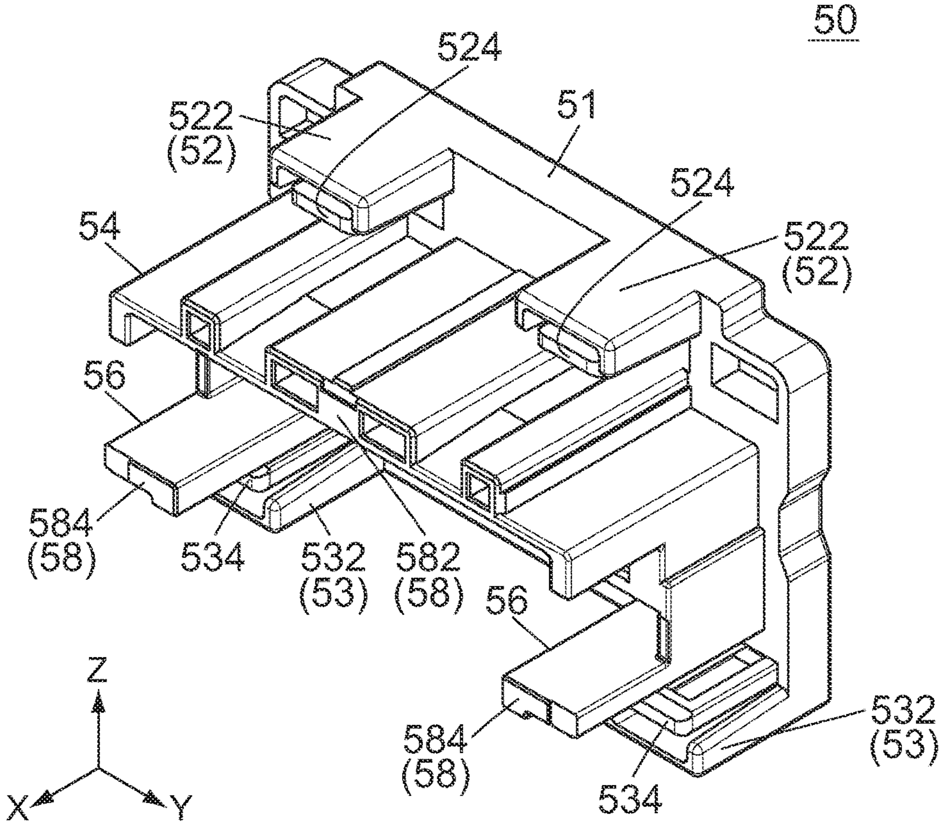
FIG. 17 is a perspective view showing one of retainers of the first connector of FIG. 9.

As shown in FIG. 17, the retainer 50 of the present embodiment has a cover 51, two upper fixation portions 52, two lower fixation portions 53, an upper projection 54 and two lower projections 56. The cover 51, the upper fixation portions 52, the lower fixation portions 53, the upper projection 54 and the lower projections 56 are integrally molded of resin. The cover 51 has a rectangular flat-plate shape in parallel to the YZ-plane as a whole. The upper fixation portions 52, the lower fixation portions 53, the upper projection 54 and the lower projections 56 extend forward from the cover 51.

The retainer 50 of the present embodiment has the aforementioned portions. However, the structure of the retainer 50 of the present invention is not specifically limited. Moreover, the structure of each portion of the retainer 50 described below can be modified as necessary.

Figure 18:
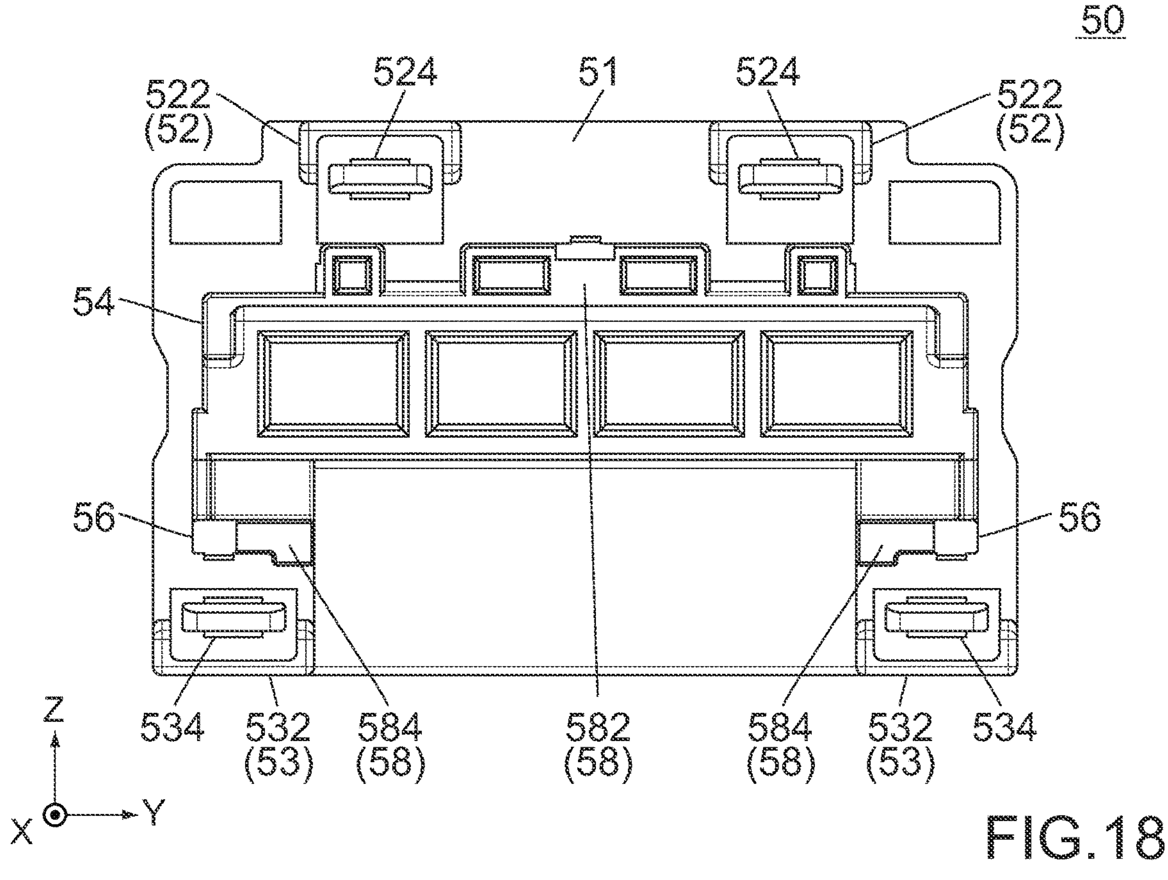
FIG. 18 is a front view showing the retainer of FIG. 17.

Referring to FIGS. 17 and 18, the upper fixation portions 52 and the lower fixation portions 53 are located at four corners of the retainer 50, or four corners of the cover 51, in the YZ-plane, respectively. In detail, the upper fixation portions 52 are located at an upper end of the cover 51 and are located at opposite sides of the cover 51 in the left-right direction, respectively. The lower fixation portions 53 are located at a lower end of the cover 51 and are located at opposite sides of the cover 51 in the left-right direction, respectively. The upper projection 54 and the lower projections 56 are located between the upper fixation portions 52 and the lower fixation portions 53 in the upper-lower direction. The lower projections 56 are located below the upper projection 54 and are located at opposite sides of the cover 51 in the left-right direction, respectively. The upper projection 54 extends in the left-right direction so as to cover the two lower projections 56 from above.

Each of the upper fixation portions 52 is formed of an upper received portion 522 and an upper engagement plate 524. Each of the upper engagement plates 524 has a flat-plate shape in parallel to the XY-plane and extends along the front-rear direction. Each of the upper engagement plates 524 is resiliently deformable. Each of the upper received portions 522 extends along the front-rear direction so as to cover the upper engagement plate 524 from above.

Each of the lower fixation portions 53 is formed of a lower received portion 532 and a lower engagement plate 534. Each of the lower engagement plates 534 has a flat-plate shape in parallel to the XY-plane and extends along the front-rear direction. Each of the lower engagement plates 534 is resiliently deformable. Each of the lower received portions 532 extends along the front-rear direction so as to cover the lower engagement plate 534 from below.

Figure 26:
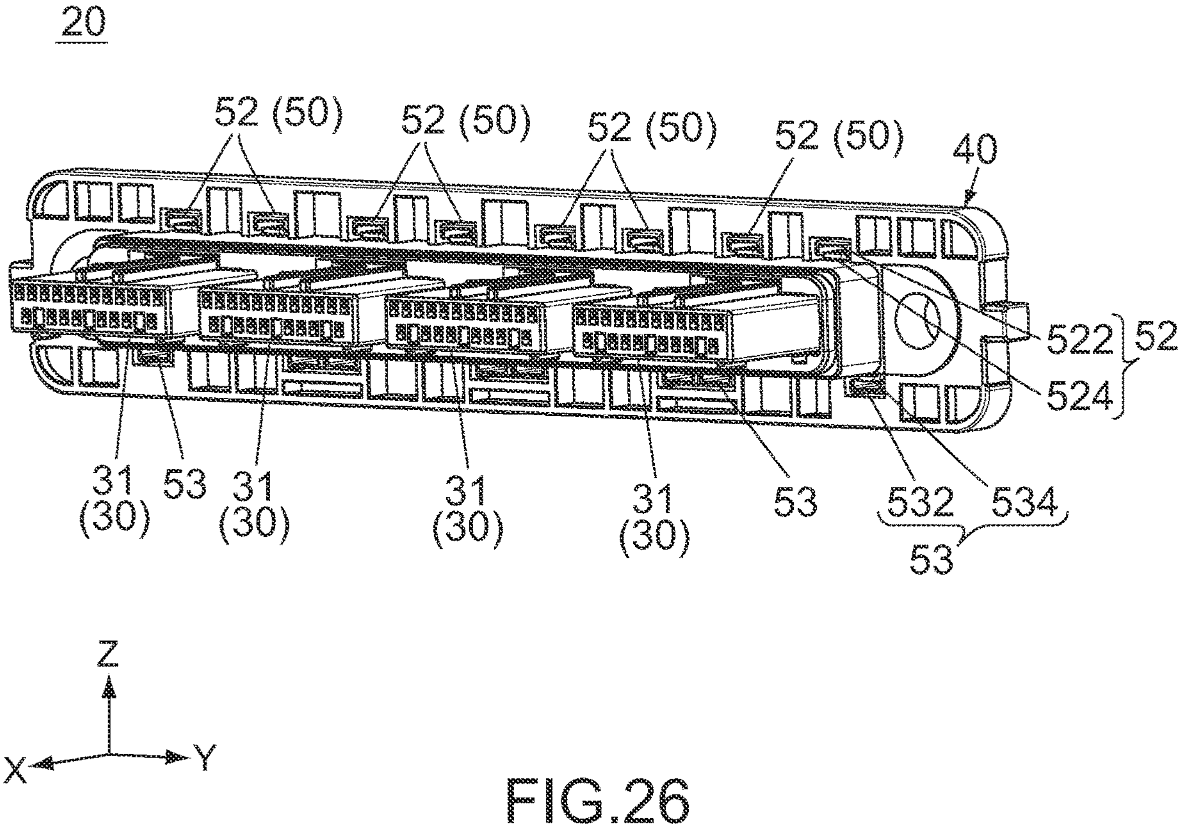
FIG. 26 is a perspective view showing the first connector of FIG. 21.

Referring to FIG. 26 together with FIG. 14, when the retainer 50 is attached to the housing 40, the upper fixation portions 52 are inserted into the upper fixation holes 48 of the housing 40, respectively, and the lower fixation portions 53 are inserted into the lower fixation holes 49 of the housing 40, respectively. The thus-inserted upper engagement plates 524 are engaged with the upper engagement projections 482 of the housing 40, respectively, and the thus-inserted lower engagement plates 534 are engaged with the lower engagement projections 492 of the housing 40, respectively. As a result, the retainer 50 attached to the housing 40 is fixed to the housing 40 at its four corners. However, the fixing method of the present invention for fixing the retainer 50 to the housing 40 is not specifically limited.

Referring to FIG. 14 together with FIGS. 16 and 20, the accommodation portion 41 of the housing 40 is provided with three stoppers 42 arranged around the accommodation portion 41. The three stoppers 42 are located at vertexes of an imaginary upward-facing isosceles triangle, respectively. Each of the stoppers 42 is a small projection which protrudes rearward. Referring to FIG. 22 together with FIG. 20, when the retainer 50 fixed to the housing 40 is further moved forward, the stoppers 42 are brought into abutment with a front surface of the retainer 50, and thereby the forward movement of the retainer 50 is stopped. According to this structure, a gap, namely a slot 22, is formed between the housing 40 and the retainer 50.

Referring to FIGS. 17 and 18, the retainer 50 of the present embodiment has three rear facing portions 58. The rear facing portions 58 of the present embodiment consist of one rear facing portion 582 and two rear facing portions 584.

According to the present embodiment, the upper projection 54 has a flat front surface, and this front surface has a middle part in the left-right direction which works as the rear facing portion 582. The two lower projections 56 have flat front surfaces, respectively, and these front surfaces have parts which work as the front definers 354, respectively. Each of the rear facing portions 58 of the present embodiment is a flat surface in parallel to the YZ-plane. Each of the rear facing portions 58 is not provided with a visible boundary. The three rear facing portions 58 are located at vertexes of an imaginary upward-facing isosceles triangle, respectively. The three rear facing portions 58 are located at positions same as each other in the front-rear direction. However, the present invention is not limited thereto. For example, each of the rear facing portions 58 may be a part which protrudes forward from the upper projection 54 or the lower projection 56. Moreover, the rear facing portions 58 may be provided as necessary.

Referring to FIGS. 23 and 24 together with FIG. 22, when the retainer 50 is fixed to the housing 40, the rear facing portion 582 faces the rear definer 362 of the sub-connector 30 in the front-rear direction, and the rear facing portions 584 face the rear definers 364 of the sub-connector 30 in the front-rear direction, respectively. As can be seen from this arrangement, the sub-connector 30 is movable rearward to a rear limit position. However, the sub-connector 30 cannot be moved rearward beyond the rear limit position. This rear limit position is a position at which the rear definers 36 are brought into abutment with the rear facing portions 58, respectively. Thus, the rear limit position is a position at which the front end of the sub-connector 30 is nearest to the housing 40.

According to the present embodiment, the three rear definers 36 are brought into abutment with the three rear facing portions 58, respectively, in a common plane in parallel to the YZ-plane. Moreover, abutment areas between the rear definers 36 and the rear facing portions 58 can be made small because small projections work as the rear definers 36. If flat surfaces and flat surfaces were brought into abutment with each other, abutment areas tend to be large. As the abutment areas are larger, it is more difficult to form the rear facing portions 58 at proper positions because of problems such as warp which might be generated in a molding process. In contrast, according to the present embodiment, the rear definers 36 which are the small projections can be easily formed at proper positions when the main portion 31 of the sub-connector 30 is molded. Even if a part which includes the rear facing portions 58 warps in a molding process of the retainer 50, the three rear definers 36 can be brought into abutment with the three rear facing portions 58, respectively.

According to the present embodiment, each of the rear definers 36 is an abutment portion which protrudes in the front-rear direction, and each of the rear facing portions 58 is a flat surface which faces this abutment portion. However, the present invention is not limited thereto. For example, each of the rear facing portions 58 may be an abutment portion which protrudes in the front-rear direction, and each of the rear definers 36 may be a flat surface which faces this abutment portion. Thus, one of the rear definer 36 and the rear facing portion 58 may be an abutment portion which protrudes in the front-rear direction, and a remaining one of the rear definer 36 and the rear facing portion 58 may be a flat surface which faces the abutment portion. Moreover, the rear definers 36 and the rear facing portions 58 may be provided as necessary.

Figure 25:
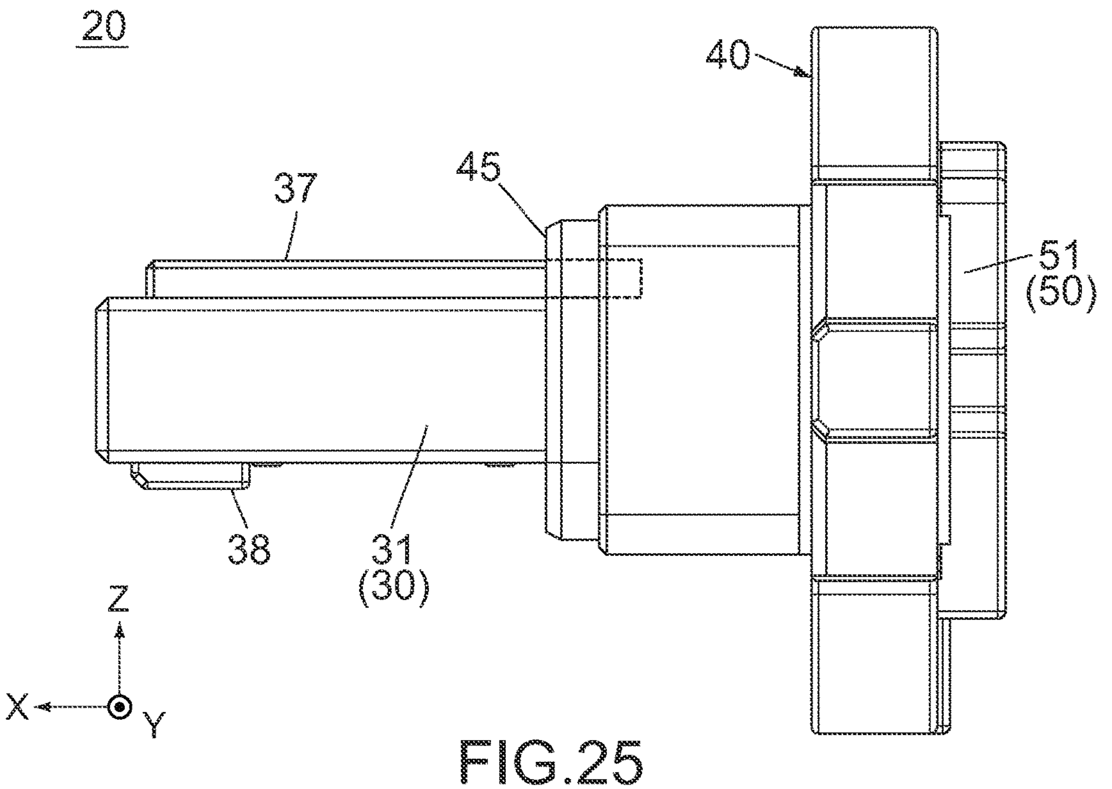
FIG. 25 is a side view showing the first connector of FIG. 21, wherein a hidden outline of an upper key of the sub-connector is illustrated with dashed line.

Referring to FIG. 22, the sub-connector 30 of the present embodiment is movable in the accommodation portion 41 along the front-rear direction. In addition, as previously described, the sub-connector 30 is movable in the accommodation portion 41 along each of the upper-lower direction and the left-right direction. In other words, the sub-connector 30 of the present embodiment is three-dimensionally floatable in the accommodation portion 41. Referring to FIG. 25, even when the sub-connector 30 floats, regardless of the position and the posture of the sub-connector 30, the upper keys 37 of the sub-connector 30 extend forward beyond the front surface 45 of the housing 40, and the lower keys 38 of the sub-connector 30 are located only forward of the front surface 45.

Referring to FIG. 11, the three rear definers 36 which define the rear limit position form an imaginary upward-facing triangle. Referring to FIG. 14, the three front facing portions 44 which defines the front limit position forms an imaginary downward-facing triangle. Referring to FIGS. 11 and 14, the upward-facing triangle and the downward-facing triangle face opposite each other in the upper lower direction. According to this arrangement, change of the posture of the sub-connector 30 which might be caused in accordance with a three-dimensional floating of the sub-connector 30 can be easily controlled, and thereby the sub-connector 30 can float three-dimensionally and stably. However, the present invention is not limited thereto. For example, the triangle formed of the three front facing portions 44 and the triangle formed of the three rear definers 36 may be arranged in the same orientation as each other in the upper-lower direction.

Figure 21:
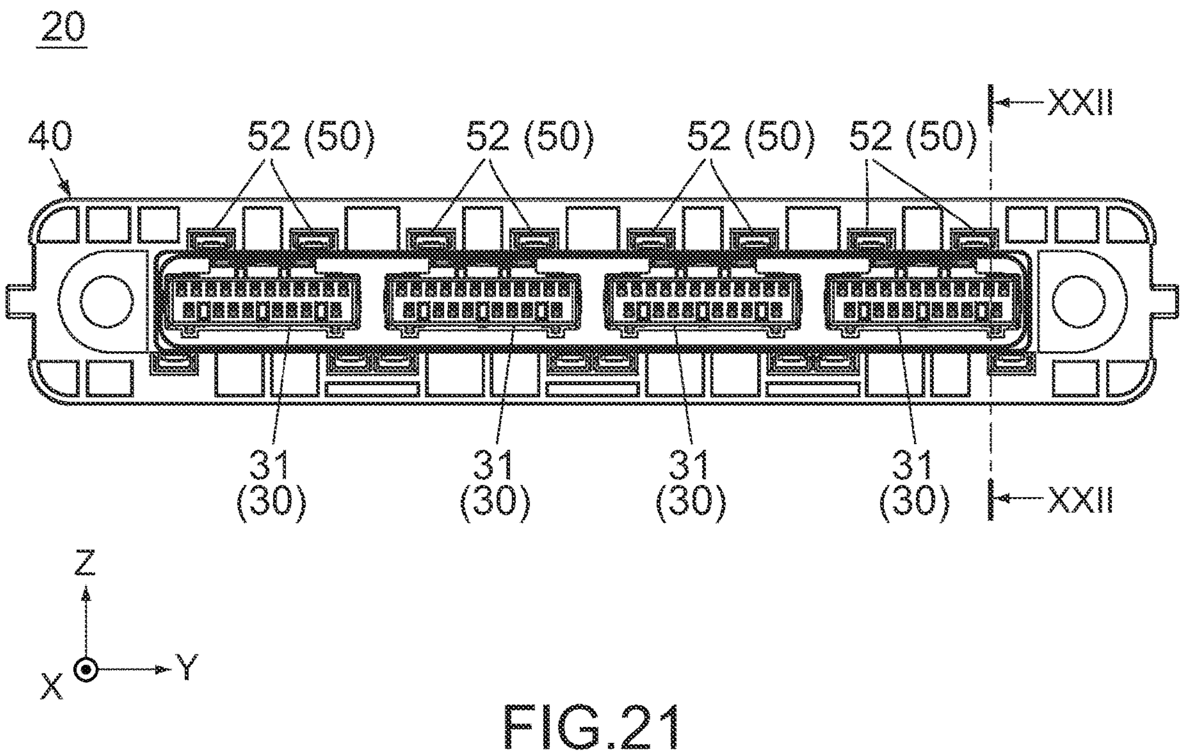
FIG. 21 is a front view showing the first connector of the connector assembly of FIG. 1.

Referring to FIGS. 19 to 22, according to the explanation described above, the retainer 50 seems to be attached to the intermediate structure 18 immediately after the formation of the intermediate structure 18 shown in FIGS. 19 and 20, and thereby the first connector 20 shown in FIGS. 21 and 22 is assembled. However, referring to FIGS. 19, 20, 27 and 28, the first connector 20 is actually assembled as described below. First, the end portions 84 of the FPC board 80 are connected to the sub-connectors 30, respectively. Then, the sub-connectors 30 and the housing 40 are combined into the intermediate structure 18. Then, the retainers 50 are attached to the intermediate structure 18.

Referring to FIG. 28, the FPC board 80 connected to the sub-connectors 30 and the retainers 50 fixed to the housing 40 do not substantially interfere with the three-dimensional floating of each of the sub-connectors 30. Thus, each of the sub-connectors 30 is partially and floatably accommodated in the corresponding accommodation portion 41.

Hereafter, explanation will be made about the first connector 20 connected to the FPC board 80 of the present embodiment.

Figure 3:
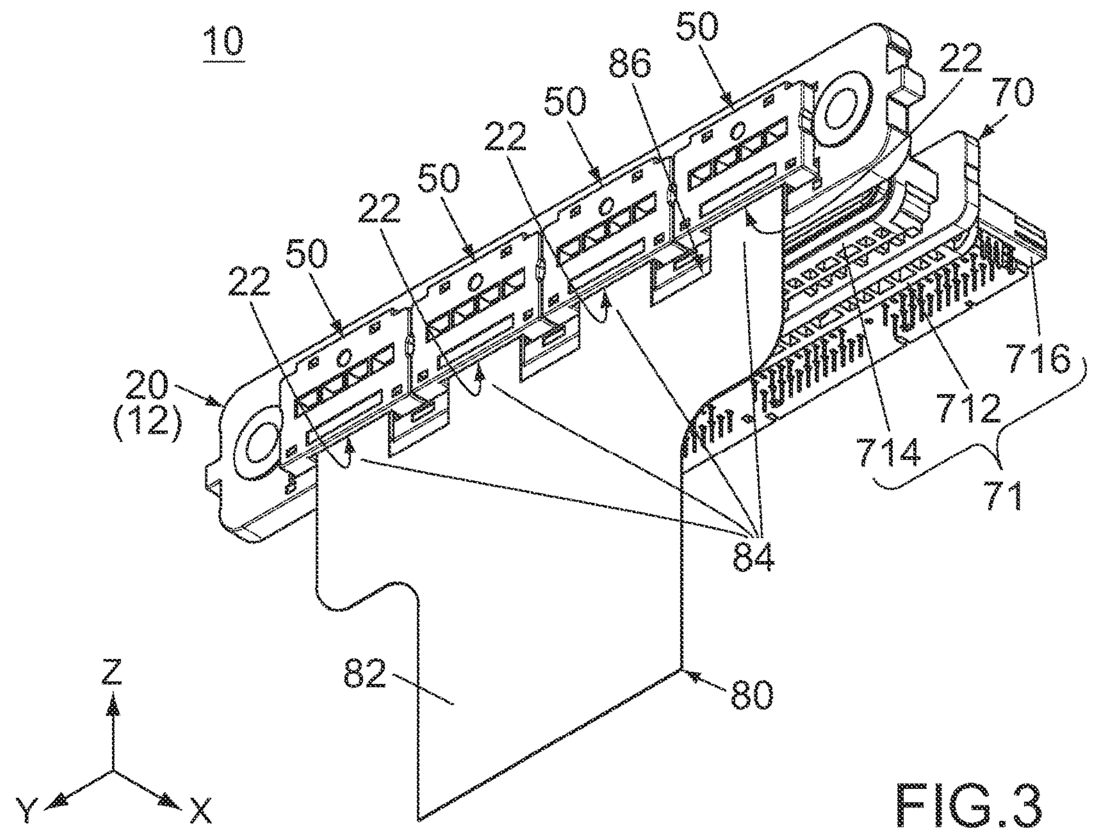
FIG. 3 is another perspective view showing the structure of FIG. 2.

Referring to FIGS. 3 and 22, the first connector 20 is formed with two or more of the slots 22 which correspond to the accommodation portions 41, respectively. Each of the slots 22 is a space which is formed between the housing 40 and the cover 51 of the retainer 50 in the front-rear direction. Thus, each of the slots 22 is located between the housing 40 and the retainer 50 in the front-rear direction.

Referring to FIG. 28 together with FIG. 22, each of the slots 22 communicates with the corresponding accommodation portion 41. Each of the slots 22 has a size in the front-rear direction which is larger than a thickness of the flat FPC board 80. The end portions 84 of the FPC board 80 are configured to be connected to the sub-connectors 30 through the slots 22, respectively. In detail, the conductive lines (not shown) of the end portions 84 are fixed and connected to the surface mount portions 62 of the first terminals 60, respectively, via soldering, etc. According to the present embodiment, since the slots 22 are provided, the four end portions 84 of the single FPC board 80 can be connected to the four sub-connectors 30, respectively.

Summarizing the explanation described above with reference to FIG. 27, the first connector 20 of the present embodiment is a connector which comprises two or more of the floatably held sub-connectors 30. The sub-connectors 30 of the present embodiment are configured to be connected to two or more of the branching end portions 84 of the FPC board 80, respectively.

According to the present embodiment, when the sub-connectors 30 connected to the FPC board 80 is attached to the housing 40, the order of the sub-connectors 30 in the left-right direction has been already determined. Therefore, when the sub-connectors 30 is attached to the housing 40, each of the sub-connectors 30 can be attached to a correct position with no mistake. Referring to FIG. 1, the present embodiment provides the connector assembly 12 which comprises the first connector 20 including two or more of the floatably held sub-connectors 30 and which enables the sub-connectors 30 to be attached to correct positions of the housing 40. In addition, according to the present embodiment, manufacturing cost can be reduced in comparison with an instance where the sub-connectors 30 are provided with mating keys different from each other.

Referring to FIG. 28, the first connector 20 of the present embodiment is a surface mount connector. In general, as the number of terminals of the surface mount connector is larger, it is more difficult to locate surface mount portions of the terminals in a common plane because of problems such as warp which might be generated in a molding process of the connector. However, according to the present embodiment, the connector is divided into the four sub-connectors 30 so that the number of the first terminals 60 of each of the thus-provided sub-connectors 30 is not more than a predetermined number. According to this structure, the surface mount portions 62 of all the first terminals 60 of each of the sub-connectors 30 can be arranged in a common plane in parallel to the XY-plane. The thus-arranged surface mount portions 62 can be properly soldered by a reflow process, for example.

Referring to FIGS. 1 and 2, the sub-connectors 30 of the first connector 20 which is assembled as described above are mateable with the second connector 70. Hereafter, explanation will be made about the second connector 70 of the present embodiment.

Referring to FIG. 1, the second connector 70 of the present embodiment comprises a second housing 71 made of insulator, a plurality of second terminals 79 each made of conductor, a locator 796 made of insulator and two fixing members 798 each made of metal. For example, the number of the second terminals 79 is eighty. The second terminals 79 are provided so that they correspond to the first terminals 60 (see FIG. 9) of the first connector 20, respectively. The second terminals 79 are held by the second housing 71. The fixing members 798 are press-fit in opposite sides of the second housing 71 in the left-right direction, respectively. The fixing members 798 fix the second connector 70 on the second device (not shown) when the second connector 70 is used. The second connector 70 of the present embodiment comprises the aforementioned members. However, the present invention is not limited thereto. For example, the locator 796 and the fixing members 798 may be provided as necessary. The second connector 70 may further comprise another member in addition to the aforementioned members.

Figure 4:
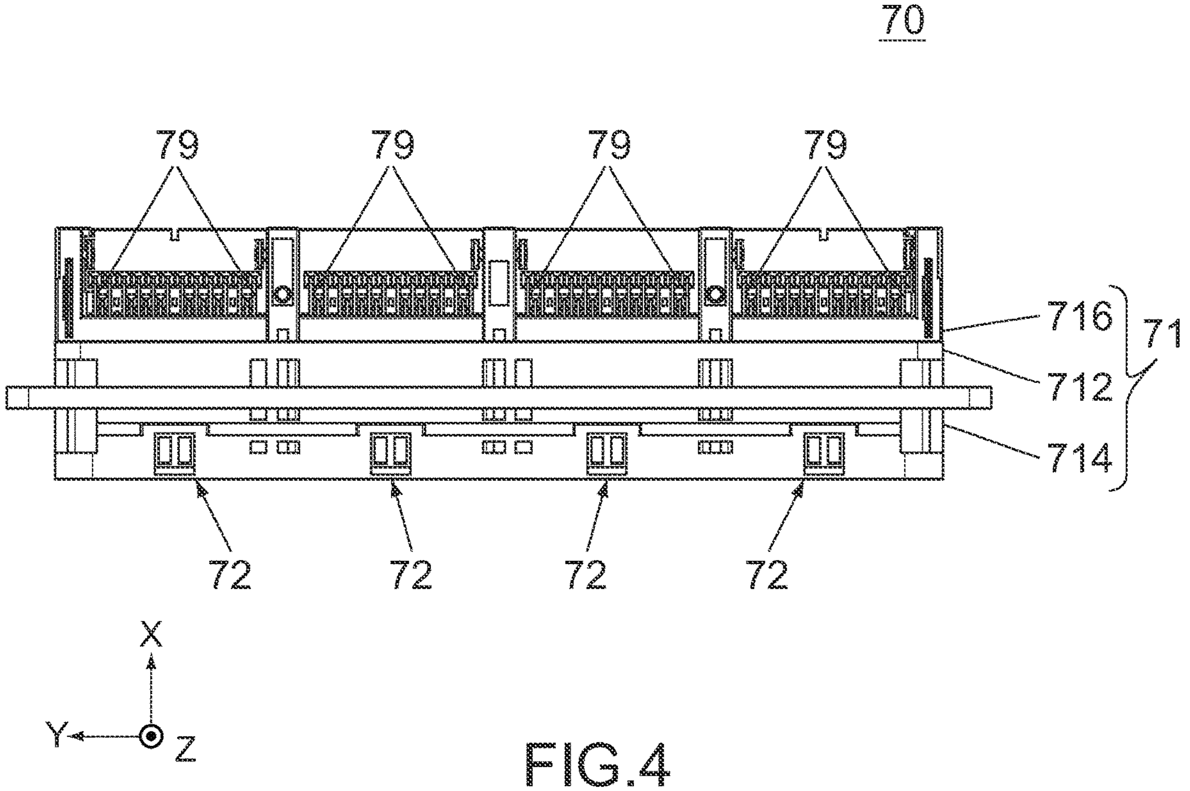
FIG. 4 is a top view showing the second connector of the connector assembly of FIG. 1.

Referring to FIGS. 1 and 4, the second housing 71 of the present embodiment extends longer in the left-right direction than in the upper-lower direction. The second housing 71 has a partition 712, a connection portion 714 and a mountable portion 716. The partition 712, the connection portion 714 and the mountable portion 716 are integrally molded of resin. The partition 712 extends in parallel to the YZ-plane as a whole. The connection portion 714 is configured to be connected to the first connector 20. The connection portion 714 protrudes rearward from the partition 712 and extends in the left-right direction. The mountable portion 716 is configured to be mounted on the second device (not shown). The mountable portion 716 protrudes forward from the partition 712 and extends in the left-right direction.

Figure 8:
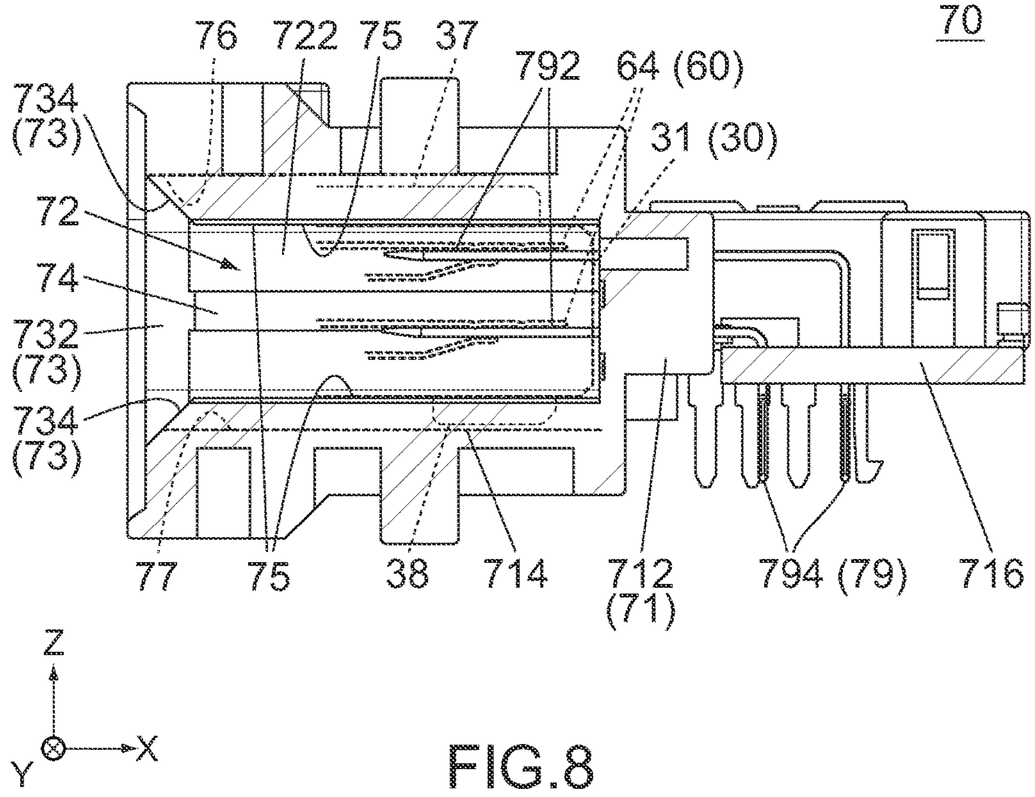
FIG. 8 is a cross-sectional view showing the second connector of FIG. 5, taken along line VIII-VIII, wherein outlines of a hidden upper channel and a hidden lower channel of the second connector and a part of an outline of the sub-connector under the mated state are illustrated with dashed line.

Referring to FIG. 1, the second connector 70 of the present embodiment has two or more mating portions 72 which correspond to the sub-connectors 30, respectively. Each of the mating portions 72 is a space which is enclosed by a mating wall 722 of the second housing 71 in the YZ-plane. Each of the mating portions 72 opens rearward and extends to the partition 712 of the second housing 71 in the front-rear direction. The mating portions 72 are arranged in the left-right direction. Referring to FIG. 8, each of the sub-connectors 30 is mateable with the corresponding mating portion 72. Each of the mating portions 72 holds the second terminals 79 which correspond to the first terminals 60 of the sub-connector 30, respectively. Each of the second terminals 79 has a second connection portion 792 and a fixed portion 794. The fixed portions 794 are fixed and connected to the second device (not shown).

The second connection portions 792 are brought into contact with the first connection portions 64 of the first terminals 60, respectively, under the mated state, and thereby the second connector 70 is electrically connected with all the sub-connectors 30. According to the present embodiment, all the first terminals 60 divided in the four sub-connectors 30 can be simultaneously connected to all the second terminals 79.

Referring to FIG. 1, the second connector 70 of the present embodiment has the aforementioned structure. The second connector 70 of the present embodiment has four of the mating portions 72. However, the structure of the second connector 70 is not specifically limited, provided that the second connector 70 has two or more of the mating portions 72 which correspond to the sub-connectors 30, respectively. For example, the number of the mating portions 72 may be two, three, five or more.

Figure 5:
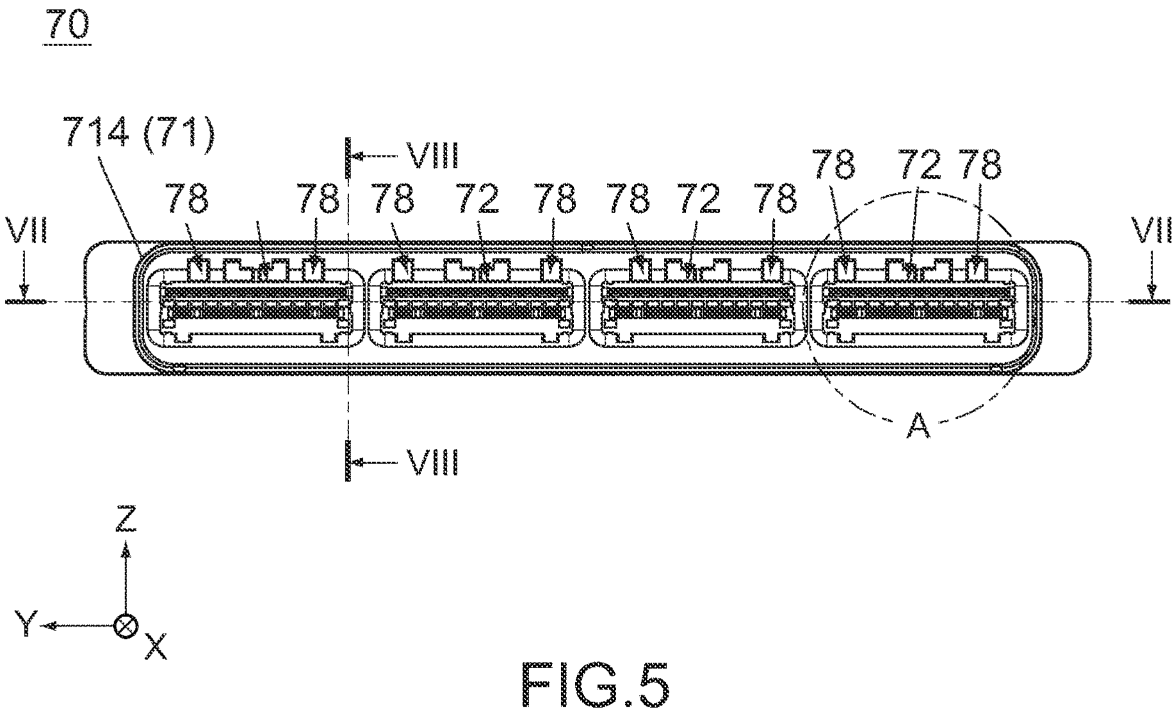
FIG. 5 is a rear view showing the second connector of FIG. 4.

Referring to FIG. 5, the mating portions 72 of the present embodiment, including portions which are provided for the respective mating portions 72, have basic structures same as each other. However, the present invention is not limited thereto. For example, in an instance where the sub-connectors 30 have structures different from each other, the mating portions 72 may have structures which correspond to the sub-connectors 30, respectively, and are different from each other. Hereafter, explanation will be made about one of the mating portions 72 of the present embodiment and about the portions which are provided for this mating portion 72. The following explanation is applicable to each of the mating portions 72.

Figure 6:
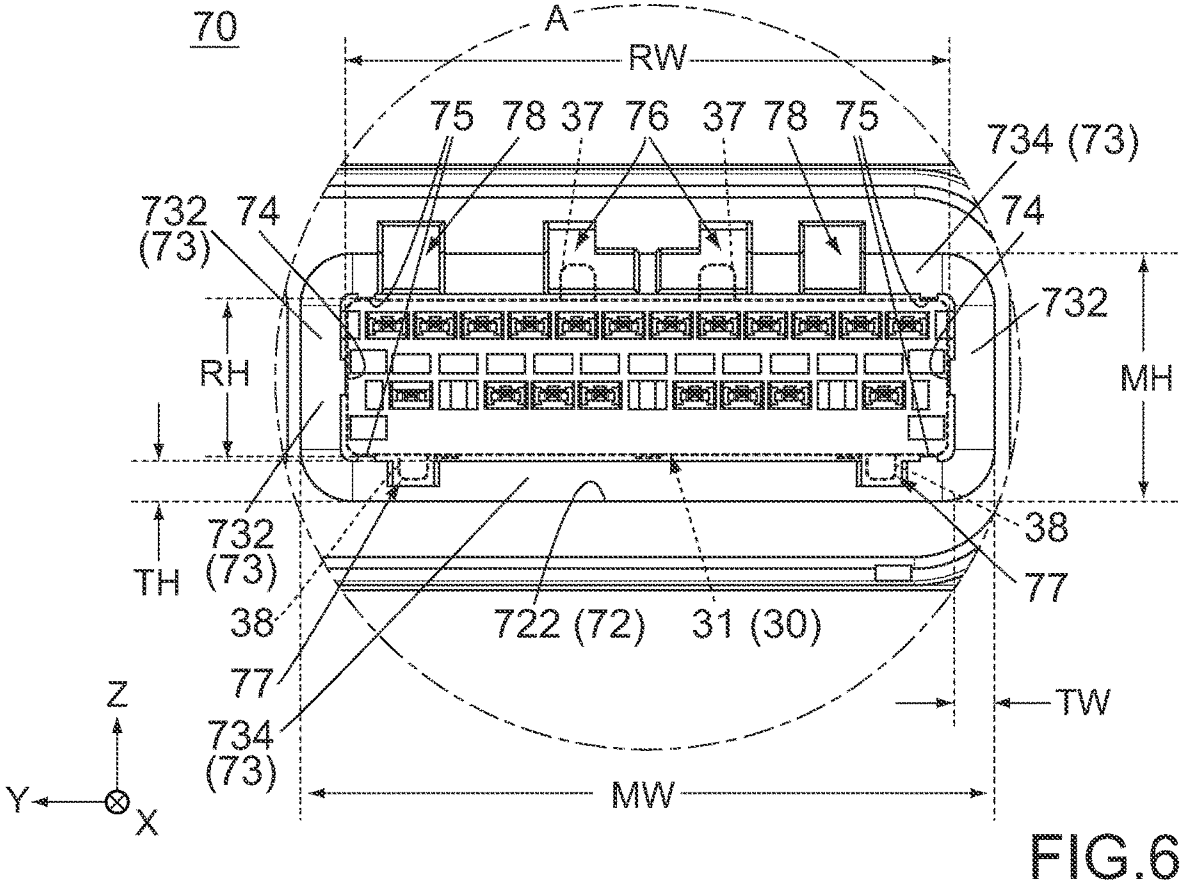
FIG. 6 is an enlarged, rear view showing a part of the second connector enclosed by chain dotted lines A of FIG. 5, wherein an outline of a sub-connector under the mated state is illustrated with dashed line.

Referring to FIG. 6, in the present embodiment, the mating portion 72 of the second connector 70 has a lateral size MW in the left-right direction and a vertical size MH in the upper-lower direction. The lateral size MW is larger than the vertical size MH. In other words, the mating portion 72 of the present embodiment is wide. According to this structure, the second connector 70 can be reduced in height. However, the present invention is not limited thereto. For example, the lateral size MW may be smaller than the vertical size MH.

The mating portion 72 of the present embodiment is provided with a tapered surface 73, two side ribs 74 and four vertical ribs 75. The tapered surface 73 is formed of two side tapered surfaces 732 and two vertical tapered surfaces 734.

Figure 7:
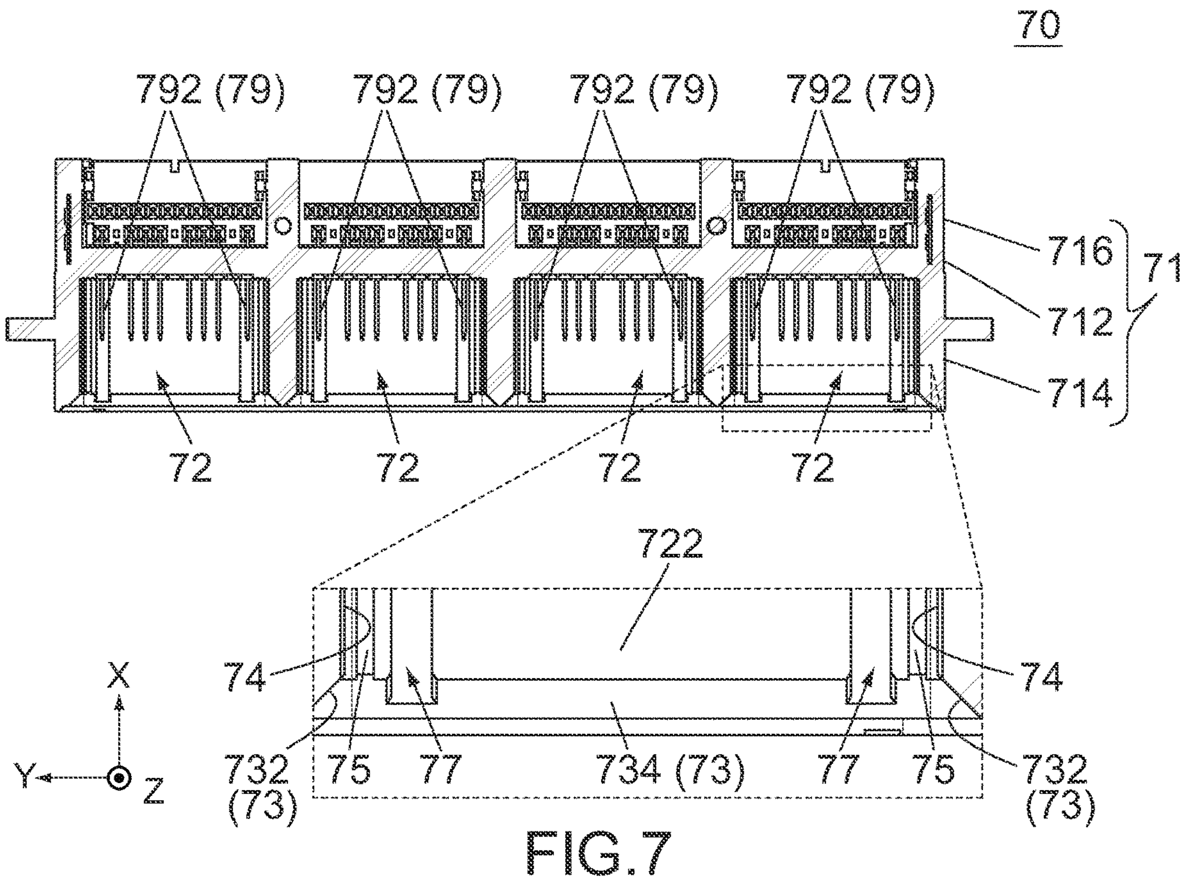
FIG. 7 is a cross-sectional view showing the second connector of FIG. 5, taken along line VII-VII, wherein a part of the second connector enclosed by dashed line is enlarged and illustrated.

Referring to FIG. 6 together with FIGS. 7 and 8, the tapered surface 73 is a rear end portion of the mating wall 722 and encloses the mating portion 72 in the YZ-plane. Thus, the tapered surface 73 is located at a rear end of the mating portion 72. The side tapered surfaces 732 are located at opposite sides of the mating portion 72 in the left-right direction, respectively. Each of the side tapered surfaces 732 extends forward while being inclined inward in the left-right direction. The vertical tapered surfaces 734 are located at opposite sides of the mating portion 72 in the upper-lower direction, respectively. Each of the vertical tapered surfaces 734 extends forward while being inclined inward in the upper-lower direction. In other words, the tapered surface 73 is provided so that the mating portion 72 is gradually narrowed as it extends forward.

Referring to FIG. 8 together with FIG. 6, in a process in which the sub-connector 30 is inserted into the mating portion 72, when a position of the main portion 31 of the sub-connector 30 in the YZ-plane is misaligned with another position of the middle part of the mating portion 72 in the YZ-plane, the front end of the main portion 31 is brought into abutment with the tapered surface 73. As a result, the sub-connector 30 receives a force directed toward the middle part of the mating portion 72 in the YZ-plane and is moved to a proper position. Thus, in a mating process in which the sub-connector 30 is mated with the mating portion 72, the tapered surface 73 guides the sub-connector 30 into the mating portion 72.

Referring to FIG. 6 together with FIGS. 7 and 8, the side ribs 74 and the vertical ribs 75 are located forward of the tapered surface 73. Each of the side ribs 74 and the vertical ribs 75 has a rear end formed with a sloping surface which is inclined into the mating portion 72. The side ribs 74 are located at opposite sides of the mating portion 72 in the left-right direction, respectively, and are located at the middle of the mating portion 72 in the upper-lower direction. The side ribs 74 protrude inward in the left-right direction and extend along the front-rear direction. Two of the vertical ribs 75 are provided on an upper surface of the mating wall 722, namely an upper mating wall 722, and remaining two of the vertical ribs 75 are provided on a lower surface of the mating wall 7222, namely a lower mating wall 722. The two upper vertical ribs 75 are located at opposite sides of the upper mating wall 722 in the left-right direction, respectively. The two lower vertical ribs 75 are located at opposite sides of the lower mating wall 722 in the left-right direction, respectively.

Referring to FIG. 8 together with FIG. 6, the sub-connector 30 is brought into abutment with the inclined rear ends of the side ribs 74 and the vertical ribs 75 after guided into the mating portion 72, and thereby a position of the sub-connector 30 in the YZ-plane is further adjusted. The sub-connector 30 is moved forward in the mating portion 72 while being sandwiched between the side ribs 74 in the left-right direction and sandwiched between the vertical ribs 75 in the upper-lower direction. When the sub-connector 30 is mated with the mating portion 72, the side ribs 74 define a movable range of the sub-connector 30 in the left-right direction, and the vertical ribs 75 define another movable range of the sub-connector 30 in the upper-lower direction.

According to the present embodiment, the floatable sub-connector 30 can be accurately positioned to the mating portion 72 by the tapered surface 73, the side ribs 74 and the vertical ribs 75. However, the present invention is not limited thereto. For example, the tapered surface 73, the side ribs 74 and the vertical ribs 75 may be provided as necessary.

The two side ribs 74 of the present embodiment are located at positions same as each other in the upper-lower direction. The upper two of the four vertical ribs 75 of the present embodiment are located at positions same as those of the lower two in the left-right direction, respectively. According to this arrangement, the sub-connector 30 can be more accurately positioned to the mating portion 72. However, the present invention is not limited thereto. For example, the mating portion 72 may be provided with only two of the vertical ribs 75. In an instance where the number of the vertical ribs 75 is two, the vertical ribs 75 may be located at opposite sides of the mating portion 72 in the upper-lower direction, respectively, may protrude inward in the upper-lower direction and may extend along the front-rear direction. In another instance where the number of the vertical ribs 75 is three, the three vertical ribs 75 may be arranged so that they are located at vertexes of an imaginary triangle. Moreover, the side ribs 74 may be located at positions different from each other in the upper-lower direction.

Referring to FIG. 6, two of the vertical ribs 75 are apart from each other by a predetermined distance RH in the upper-lower direction. The tapered surface 73 has a size TW in the left-right direction and a size TH in the upper-lower direction. In detail, each of the side tapered surfaces 732 has the size TW in the left-right direction. Each of the vertical tapered surfaces 734 has the size TH in the upper-lower direction. Each of the size TW and the size TH is equal to or more than one fifth of the predetermined distance RH. In other words, the tapered surface 73 has a size which is equal to or more than one fifth of the predetermined distance RH in each of the left-right direction and the upper-lower direction.

The size TW and the size TH of the tapered surface 73 of the present embodiment are rather larger than those of the existing technique. According to the present embodiment, even in a case where a position of the first connector 20 in the YZ-plane is relatively largely misaligned to another position of the second connector 70 in the YZ-plane in the mating process in which the first connector 20 is mated with the second connector 70, the tapered surface 73 can adjust the position of the sub-connector 30 in the YZ-plane when a slight forward force is applied to the sub-connector 30. Therefore, when one of the first connector 20 and the second connector 70 is held by an arm of the robot (not shown) and is relatively moved toward a remaining one of the first connector 20 and the second connector 70, the sub-connector 30 is mated with the second connector 70 with a small insertion force. However, the present invention is not limited thereto. For example, the size of the tapered surface 73 may be determined as necessary.

Referring to FIG. 6 together with FIG. 8, in the present embodiment, the mating portion 72 is formed with two upper channels 76 located over the mating portion 72 and is formed with two lower channels 77 located under the mating portion 72. Each of the upper channels 76 and the lower channels 77 extends through the connection portion 714 along the front-rear direction and opens rearward. The upper channels 76 and the lower channels 77 are located at positions different from each other in the left-right direction.

When the sub-connector 30 is inserted into the mating portion 72 under a proper posture in which the upper keys 37 are located above the lower keys 38, the upper keys 37 are received in the upper channels 76, respectively, and the lower keys 38 are received in the lower channels 77, respectively. Thus, the second connector 70 is formed with the upper channels 76 which correspond to the upper keys 37 of the sub-connector 30 and the lower channels 77 which correspond to the lower keys 38 of the sub-connector 30. In the mating process in which the sub-connector 30 is mated with the mating portion 72 of the second connector 70, the upper keys 37 are received in the upper channels 76, and the lower keys 38 are received in the lower channels 77.

Referring to FIG. 1 together with FIG. 6, according to the present embodiment, upon an attempt of mating the first connector 20 with the second connector 70 upside-down, the upper keys 37 and the lower keys 38 are brought into abutment with the tapered surface 73 of the mating portion 72. and thereby the first connector 20 cannot be mated with the second connector 70. Thus, the upper keys 37 and the lower keys 38 not only work as keys which prevent the reverse accommodation of the sub-connector 30 in the housing 40 but also work as mating keys which prevent reverse mating of the first connector 20.

Referring to FIGS. 1 and 2, the first connector 20 and the second connector 70 of the present embodiment are mateable with each other as described above. Referring to FIG. 1 together with FIGS. 23 and 24, when the first connector 20 is relatively moved toward the second connector 70, each of the sub-connectors 30 receives a rearward force from the second connector 70, and the sub-connectors 30 are simultaneously mated with the second connector 70 while being moved to the rear limit positions. Meanwhile, the rear definers 36 of the sub-connector 30 are brought into abutment with the rear facing portions 58 of the retainer 50 in a plane in parallel to the YZ-plane. As previously described, the abutment areas between the rear definers 36 and the rear facing portions 58 are small. Accordingly, even when the position of the sub-connector 30 in the YZ-plane is misaligned, the sub-connector 30 is smoothly moved to a proper position in the YZ-plane substantially with no friction force and extends straight along the front-rear direction. Thus, the rear definers 36 and the rear facing portions 58 make the posture of the sub-connector 30 stable when the sub-connector 30 is mated.

When the first connector 20 mated with the second connector 70 is pulled rearward, each of the sub-connectors 30 receives a forward force from the second connector 70, and the sub-connectors 30 are simultaneously removed from the second connector 70 while being moved to the front limit positions. Meanwhile, the front facing portions 44 of the housing 40 are brought into abutment with the front definers 35 of the sub-connector 30 in a plane in parallel to the YZ-plane. As previously described, the abutment areas between the front facing portions 44 and the front definers 35 are small. Accordingly, even when a direction along which the first connector 20 is pulled is oblique to the front-rear direction, the sub-connector 30 is smoothly moved in the YZ-plane substantially with no friction force and extends straight along the front-rear direction. Thus, the front definers 35 and the front facing portions 44 make the posture of the sub-connector 30 stable when the sub-connector 30 is removed.

Referring to FIGS. 1 and 2, the connector assembly 12 of the present embodiment forms the structure 10 together with the FPC board 80 as previously described. Thus, the structure 10 of the present embodiment comprises the connector assembly 12 and the single FPC board 80 which has two or more of the branching end portions 84. The sub-connectors 30 are connected to the end portions 84, respectively.

The present invention is further variously applicable in addition to the already described embodiment and various modifications. For example, referring to FIGS. 6 and 8, each of the mating portions 72 of the second connector 70 of the present embodiment is formed with two key grooves 78 located over the mating portion 72. In each of the mating portions 72, the two upper channels 76 are located between the two key grooves 78 in the left-right direction. Each of the key grooves 78 extends along the front-rear direction and opens rearward. The arrangements of the key grooves 78 of the four mating portions 72 are different from each other.

For example, the second connector 70 may be connected to four connectors (not shown) which are independent of each other and are attached to discrete cables, respectively, instead of the first connector 20 (see FIG. 1) of the present embodiment. In this instance, each of the connectors may be provided with mating keys which correspond to the key grooves 78.

Referring to FIG. 1, each of the retainers 50 may be provided with a hole through which the end portion 84 of the FPC board 80 can pass along the front-rear direction. Moreover, in an instance where the first connector 20 is provided with none of the retainers 50, the FPC board 80 including the end portions 84 may extend along the front-rear direction. However, according to an instance where none of the retainers 50 is provided, when the first connector 20 is mated with the second connector 70, the sub-connector 30 might come off the accommodation portion 41 (see FIG.

9) by a rearward force applied thereto. Therefore, it is preferable that the retainers 50 are provided unless there is a specific reason.

What is claimed is:

1. A connector assembly comprising:

a first connector; and a second connector, wherein:

the first connector is a surface-mount connector;

the first connector and the second connector are mateable with each other along a front-rear direction;

the first connector comprises two or more sub-connectors and a housing;

the sub-connectors are configured to be connected to two or more branching end portions of a single flexible printed circuits (FPC) board, respectively;

the housing holds each of the sub-connectors;

each of the sub-connectors is floatable relative to the housing;

the second connector comprises two or more mating portions which correspond to the sub-connectors, respectively; and each of the sub-connectors is mateable with a corresponding one of the mating portions.

2. The connector assembly as recited in claim 1, wherein:

the first connector comprises a retainer;

the retainer is fixed to the housing;

the housing is formed with two or more accommodation portions which correspond to the sub-connectors, respectively;

each of the accommodation portions opens rearward from the housing;

each of the sub-connectors is partially and floatably accommodated in a corresponding one of the accommodation portions;

the retainer covers the sub-connectors from behind;

the first connector is formed with two or more slots which correspond to the accommodation portions, respectively;

each of the slots is located between the housing and the retainer in the front-rear direction; and each of the slots communicates with a corresponding one of the accommodation portions.

3. The connector assembly as recited in claim 2, wherein:

at least one of the accommodation portions of the housing is provided with a regulation portion;

the regulation portion extends in the accommodation portion;

at least one of the sub-connectors which corresponds to the at least one of the accommodation portions has a regulated portion;

one of the regulation portion and the regulated portion is resiliently deformable; and when the at least one of the sub-connectors is accommodated in the at least one of the accommodation portion, the regulation portion and the regulated portion face each other in the front-rear direction and prevent the sub-connector from coming off the accommodation portion.

4. The connector assembly as recited in claim 2, wherein:

at least one of the sub-connectors has a rear definer;

the retainer has a rear facing portion;

one of the rear definer and the rear facing portion is an abutment portion which protrudes in the front-rear direction, and a remaining one of the rear definer and the rear facing portion is a flat surface which faces the abutment portion;

the at least one of the sub-connectors is movable rearward to a rear limit position; and the rear limit position is a position at which the rear definer is brought into abutment with the rear facing portion.

5. The connector assembly as recited in claim 1, wherein:

at least one of the sub-connectors has a front definer;

the housing has a front facing portion;

one of the front definer and the front facing portion is an abutment portion which protrudes in the front-rear direction, and a remaining one of the front definer and the front facing portion is a flat surface which faces the abutment portion;

the at least one of the sub-connectors is movable forward to a front limit position; and the front limit position is a position at which the front definer is brought into abutment with the front facing portion.

6. The connector assembly as recited in claim 1, wherein:

at least one of the mating portions of the second connector has a lateral size in a left-right direction perpendicular to the front-rear direction and a vertical size in an upper-lower direction perpendicular to both the front-rear direction and the left-right direction;

the lateral size is larger than the vertical size;

the at least one of the mating portions is provided with a tapered surface, two side ribs and two vertical ribs;

the side ribs and the vertical ribs are located forward of the tapered surface;

the side ribs are located at opposite sides of the mating portion in the left-right direction, respectively, protrude inward in the left-right direction, and extend along the front-rear direction;

the vertical ribs are located at opposite sides of the mating portion in the upper-lower direction, respectively, protrude inward in the upper-lower direction, and extend along the front-rear direction;

in a mating process in which at least one of the sub-connectors is mated with the at least one of the mating portions, the tapered surface guides the at least one of the sub-connectors into the mating portion; and when the at least one of the sub-connectors is mated with the at least one of the mating portions, the side ribs define a movable range of the sub-connector in the left-right direction, and the vertical ribs define another movable range of the at least one of the sub-connectors in the upper-lower direction.

7. The connector assembly as recited in claim 6, wherein:

for each of the mating portions, the two vertical ribs are apart from each other by a predetermined distance in the upper-lower direction; and for each of the mating portions, the tapered surface has a size equal to or more than one fifth of the predetermined distance in each of the left-right direction and the upper-lower direction.

8. The connector assembly as recited in claim 1, wherein the sub-connectors have structures same as each other.

9. The connector assembly as recited in claim 2, wherein:

at least one of the sub-connectors has an upper key and a lower key;

the upper key and the lower key are located at positions different from each other in a left-right direction perpendicular to the front-rear direction;

the housing has a front surface, an upper passage and a lower passage;

the front surface is located at a front end of the housing;

the upper passage opens at the front surface and allows the upper key to pass therethrough in a process in which the at least one of the sub-connectors is accommodated in the corresponding one of the accommodation portions;

the lower passage opens at the front surface and allows the lower key to pass therethrough in the process in which the at least one of the sub-connectors is accommodated in the accommodation portion; and when the at least one of the sub-connectors is accommodated in the corresponding one of the accommodation portions, one of the upper key and the lower key is located only forward of the front surface of the housing, and a remaining one of the upper key and the lower key is movable in the upper passage or the lower passage.

10. The connector assembly as recited in claim 9, wherein:

the second connector is formed with an upper channel which corresponds to the upper key and a lower channel which corresponds to the lower key;

the upper channel and the lower channel are located at positions different from each other in the left-right direction; and in a mating process in which the at least one of the sub-connectors is mated with the corresponding one of the mating portions of the second connector, the upper key is received in the upper channel, and the lower key is received in the lower channel.

11. A structure comprising:

a single flexible printed circuits (FPC) board having two or more branching end portions; and a connector assembly comprising a first connector and a second connector, wherein:

the first connector is a surface-mount connector;

the first connector and the second connector are mateable with each other along a front-rear direction;

the first connector comprises two or more sub-connectors and a housing;

the sub-connectors are connected to the end portions of the FPC board, respectively;

the housing holds each of the sub-connectors;

each of the sub-connectors is floatable relative to the housing;

the second connector comprises two or more mating portions which correspond to the sub-connectors, respectively; and each of the sub-connectors is mateable with a corresponding one of the mating portions.

12. A connector assembly comprising:

a first connector; and a second connector, wherein:

the first connector and the second connector are mateable with each other along a front-rear direction;

the first connector comprises two or more sub-connectors and a housing;

the sub-connectors are configured to be connected to two or more branching end portions of a single flexible printed circuits (FPC) board, respectively;

the housing holds each of the sub-connectors;

each of the sub-connectors is floatable relative to the housing;

the second connector comprises two or more mating portions which correspond to the sub-connectors, respectively;

each of the sub-connectors is mateable with a corresponding one of the mating portions; and the housing is formed with two or more accommodation portions which correspond to the sub-connectors, respectively.

* * * * *